United States Patent
Yang et al.

(10) Patent No.: US 11,777,560 B2
(45) Date of Patent: *Oct. 3, 2023

(54) TECHNIQUES FOR MULTIPLE FEEDBACK TRANSMISSIONS PER SLOT IN WIRELESS COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Jing Jiang, San Diego, CA (US); Chih-Ping Li, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,681

(22) Filed: Dec. 27, 2021

(65) Prior Publication Data

US 2022/0123794 A1 Apr. 21, 2022

Related U.S. Application Data

(63) Continuation of application No. 16/544,417, filed on Aug. 19, 2019, now Pat. No. 11,233,547.
(Continued)

(51) Int. Cl.
| | | |
|---|---|---|
| *H04B 7/0417* | (2017.01) | |
| *H04W 72/044* | (2023.01) | |
| *H04W 76/27* | (2018.01) | |
| *H04W 72/121* | (2023.01) | |
| *H04W 72/23* | (2023.01) | |
| *H04W 84/04* | (2009.01) | |

(52) U.S. Cl.
CPC ........ *H04B 7/0417* (2013.01); *H04W 72/044* (2013.01); *H04W 72/121* (2013.01); *H04W 72/23* (2023.01); *H04W 76/27* (2018.02); *H04W 84/042* (2013.01)

(58) Field of Classification Search
None
See application file for complete search history.

(56) References Cited

U.S. PATENT DOCUMENTS

| | | |
|---|---|---|
| 9,924,498 B2 | 3/2018 | Chen et al. |
| 2013/0301490 A1 | 11/2013 | He et al. |

(Continued)

FOREIGN PATENT DOCUMENTS

| | | |
|---|---|---|
| CN | 104982063 A | 10/2015 |
| KR | 101546075 B1 | 9/2015 |

(Continued)

OTHER PUBLICATIONS

LG Electronics: "Discussion on Layer 1 Enhancements", 3GPP TSG RAN WG1 Meeting #94, 3GPP, R1-1808531, Gothenburg, Sweden, Aug. 20-24, 2018, Aug. 11, 2018, 10 Pages.

(Continued)

*Primary Examiner* — Saumit Shah
(74) *Attorney, Agent, or Firm* — Arent Fox, LLP

(57) ABSTRACT

Aspects described herein relate to partitioning slots in wireless communications into virtual mini-slots at least for the purpose of transmitting multiple feedback transmissions within the slot.

34 Claims, 13 Drawing Sheets

Related U.S. Application Data

(60) Provisional application No. 62/720,897, filed on Aug. 21, 2018.

(56) References Cited

U.S. PATENT DOCUMENTS

| | | | |
|---|---|---|---|
| 2018/0035459 | A1 | 2/2018 | Islam et al. |
| 2018/0063858 | A1 | 3/2018 | Au et al. |
| 2018/0077719 | A1 | 3/2018 | Nory et al. |
| 2018/0115966 | A1 | 4/2018 | Chen et al. |
| 2018/0324861 | A1 | 11/2018 | Oh et al. |
| 2019/0281622 | A1 | 9/2019 | Hwang et al. |
| 2019/0335449 | A1 | 10/2019 | Xiong et al. |
| 2019/0349795 | A1 | 11/2019 | Park et al. |
| 2019/0349941 | A1 | 11/2019 | Yang et al. |
| 2019/0364563 | A1 | 11/2019 | Jung et al. |
| 2020/0015119 | A1 | 1/2020 | Takeda et al. |
| 2020/0067574 | A1 | 2/2020 | Yang et al. |
| 2020/0196335 | A1 | 6/2020 | Lei et al. |
| 2020/0351838 | A1 | 11/2020 | Kim et al. |
| 2020/0351923 | A1* | 11/2020 | Karaki .............. H04W 72/1278 |
| 2020/0358562 | A1* | 11/2020 | Peng .................... H04L 5/0055 |
| 2022/0330253 | A1 | 10/2022 | Yang et al. |

FOREIGN PATENT DOCUMENTS

| | | |
|---|---|---|
| TW | 201429297 A | 7/2014 |
| WO | 0072465 A1 | 11/2000 |
| WO | 2013138389 A2 | 9/2013 |
| WO | 2017172452 A1 | 10/2017 |
| WO | 2018016848 A1 | 1/2018 |
| WO | 2018028435 A1 | 2/2018 |
| WO | 2018145115 A1 | 8/2018 |

OTHER PUBLICATIONS

Taiwan Search Report—TW108129600—TIPO—dated Apr. 26, 2022.
VIVO: "Layer 1 Enhancements for URLLC", 3GPP TSG RAN WG1 Meeting #94, 3GPP, R1-1808248, Gothenburg, Sweden, Aug. 20-24, 2018, Aug. 10, 2018, 10 pages.
Ericsson et al., "Text Proposal on 1ms HARQ Bits Inclusion in a Slot/Subslot Transmission", 3GPP Draft, 3GPP TSG-RAN WG1 Meeting #92, R1-1803248—1MS HARQ Bits Inclusion, 3rd Generation Partnership Project (3GPP), Mobile Competence Center, 650, Route Des Lucioles, F-06921, Sophia-Antipolis Cedex, France, vol. RAN WG1, No. Athens, Greece, Feb. 26-Mar. 2, 2018, Feb. 22, 2018 (Feb. 22, 2018), XP051398361, 12 pages.
Huawei, et al., "Control Signaling Enhancements for Short TTI", 3GPP Draft, 3GPP TSG-RAN WG1#83, R1-156461, 3rd Generation Partnership Project (3GPP), France, vol. RAN WG1, No. Anaheim, USA, Nov. 15-22, 2015, Nov. 15, 2015 (Nov. 15, 2015), XP051002921, 6 Pages, Nov. 7, 2015 (Nov. 7, 2015), Sections 2-3.
Huawei et al., "PUCCH Resource Allocation for Non-Slot Scheduling", 3GPP Draft; R1-1804293, 3rd Generation Partnership Project (3GPP), France, vol. RAN WG1, No. Sanya, China; Apr. 16-20, 2018, Apr. 15, 2018 (Apr. 15, 2018), XP051426581, 3 Pages, Section 2.
Huawei et al., "Summary of 7.2.2 Study of Necessity of a New DCI Format", 3GPP Draft; R1-1803413, 3rd Generation Partnership Project (3GPP), France, vol. RAN WG1, No. Athens, Greece; Feb. 26-Mar. 2, 2018, Mar. 1, 2018 (Mar. 1, 2018), XP051398635, 21 Pages, tables 3.2-1, 3.2-2.
International Preliminary Report on Patentability—PCT/US2019/031812, The International Bureau of WIPO—Geneva, Switzerland, dated Nov. 26, 2020.
International Preliminary Report on Patentability—PCT/US2019/047266, The International Bureau of WIPO—Geneva, Switzerland, dated Mar. 4, 2021.
International Search Report and Written Opinion—PCT/US2019/047266—ISA/EPO—dated Jan. 30, 2020.
International Search Report and Written Opinion—PCT/US2019/031812—ISA/EPO—dated Dec. 18, 2019.
LG Electronics: "Discussion on pre-emption indication for downlink", 3GPP Draft; R1-1710336 Discussion on Preemption Indication for DL, 3rd Generation Partnership Project (3GPP), France, vol. RAN WG1, No. Qingdao, P.R. China; Jun. 27-30, 2017, Jun. 26, 2017 (Jun. 26, 2017), XP051299551, 4 Pages, Sections 2-4, Options 1-3.
Partial International Search Report—PCT/US2019/047266—ISA/EPO—dated Nov. 11, 2019.
Partial International Search Report—PCT/US2019/031812—ISA/EPO—dated Jul. 1, 2019.
ZTE., et al., "URLLC PHY Enhancements", 3GPP Draft, 3GPP TSG RAN WG1 Meeting #94, R1-1808211, URLLC PHY Enhancements, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20-24, 2018, Aug. 11, 2018 (Aug. 11, 2018), XP051515596, 10 Pages.
Qualcomm Incorporated: "DL/UL Resource Allocation", 3GPP TSG-RAN WG1 Meeting AH 1801, R1-1800875, DL-UL-Resource Allocation, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, Jan. 13, 2018, XP051385145, pp. 1-10, Appendix I and II.
Sequans: "PUCCH Enhancements", 3GPP TSG RAN WG1 Meeting #94, R1-1809320, Gothenburg, Sweden, Aug. 20-24, 2018, 3 Pages.
Taiwan Search Report—TW111127700—TIPO—dated Mar. 13, 2023.

* cited by examiner

TECHNIQUES FOR MULTIPLE FEEDBACK TRANSMISSIONS PER SLOT IN WIRELESS COMMUNICATIONS

CLAIM OF PRIORITY UNDER 35 U.S.C. § 119

The present Application for Patent is a continuation of application Ser. No. 16/544,417, entitled "TECHNIQUES FOR MULTIPLE FEEDBACK TRANSMISSIONS PER SLOT IN WIRELESS COMMUNICATIONS" filed Aug. 19, 2019, which claims priority to Provisional Application No. 62/720,897, entitled "TECHNIQUES FOR MULTIPLE FEEDBACK TRANSMISSIONS PER SLOT IN WIRELESS COMMUNICATIONS" filed Aug. 21, 2018, which are assigned to the assignee hereof and hereby expressly incorporated by reference herein for all purposes.

BACKGROUND

Aspects of the present disclosure relate generally to wireless communication systems, and more particularly, to transmitting feedback in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving a configuration for transmitting feedback for communications received in multiple virtual mini-slots of a slot, wherein the configuration specifies a partitioning of the slot into the multiple virtual mini-slots, generating feedback for a communication received in one or more of the multiple virtual mini-slots, determining a virtual mini-slot over which to transmit the feedback based at least in part on determining a last symbol of the communication with respect to the one or more of the multiple virtual min-slots, and transmitting, during the virtual mini-slot, the feedback for the communication.

In another example, a method for wireless communication is provided. The method includes receiving a configuration for transmitting, in multiple symbols of a slot, separate feedback signals for each of multiple communications received in the slot, wherein the configuration specifies a number of symbols between receiving each of the multiple communications and transmitting associated feedback, generating feedback for each of the multiple communications, and transmitting, during the multiple symbols of the slot and based on the configuration, the separate feedback signals for each of the multiple communications.

In another example, a method for wireless communication is provided. The method includes receiving a configuration for communicating in multiple virtual mini-slots of a slot, wherein the configuration specifies a partitioning of the slot into the multiple virtual mini-slots, receiving an indication of a number of the multiple virtual mini-slots to occur between receiving a resource grant and communicating over resources corresponding to the resource grant, and communicating, based on the indication, over the resources corresponding to the resource grant.

In another example, a method for wireless communication is provided. The method includes transmitting a configuration for transmitting feedback for communications received in multiple virtual mini-slots of a slot, wherein the configuration specifies a partitioning of the slot into the multiple virtual mini-slots, transmitting a communication in one or more of the multiple virtual mini-slots, and receiving, based on the configuration, feedback for the communication.

In another example, a method for wireless communication is provided. The method includes transmitting a configuration for communicating in multiple virtual mini-slots of a slot, wherein the configuration specifies a partitioning of the slot into the multiple virtual mini-slots, transmitting an indication of a number of the multiple virtual mini-slots to occur between receiving a resource grant and communicating over resources corresponding to the resource grant, and communicating, based on the indication, over the resources corresponding to the resource grant In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In one example, an apparatus for wireless communication is provided that includes a transceiver, a memory configured to store instructions, and one or more processors communicatively coupled with the transceiver and the memory. The one or more processors are configured to transmit a configuration for transmitting feedback for communications received in multiple virtual mini-slots of a slot, wherein the configuration specifies a partitioning of the slot into the multiple virtual mini-slots, transmitting a communication in one or more of the multiple virtual mini-slots, and receive, based on the configuration, feedback for the communication.

In another example, an apparatus for wireless communication is provided that includes means for transmitting a configuration for transmitting feedback for communications received in multiple virtual mini-slots of a slot, wherein the configuration specifies a partitioning of the slot into the multiple virtual mini-slots, transmitting a communication in one or more of the multiple virtual mini-slots, and means for receiving, based on the configuration, feedback for the communication.

In another example, a computer-readable medium including code executable by one or more processors for wireless communication is provided. The code includes code for transmitting a configuration for transmitting feedback for communications received in multiple virtual mini-slots of a slot, wherein the configuration specifies a partitioning of the slot into the multiple virtual mini-slots, transmitting a communication in one or more of the multiple virtual mini-slots, and receiving, based on the configuration, feedback for the communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
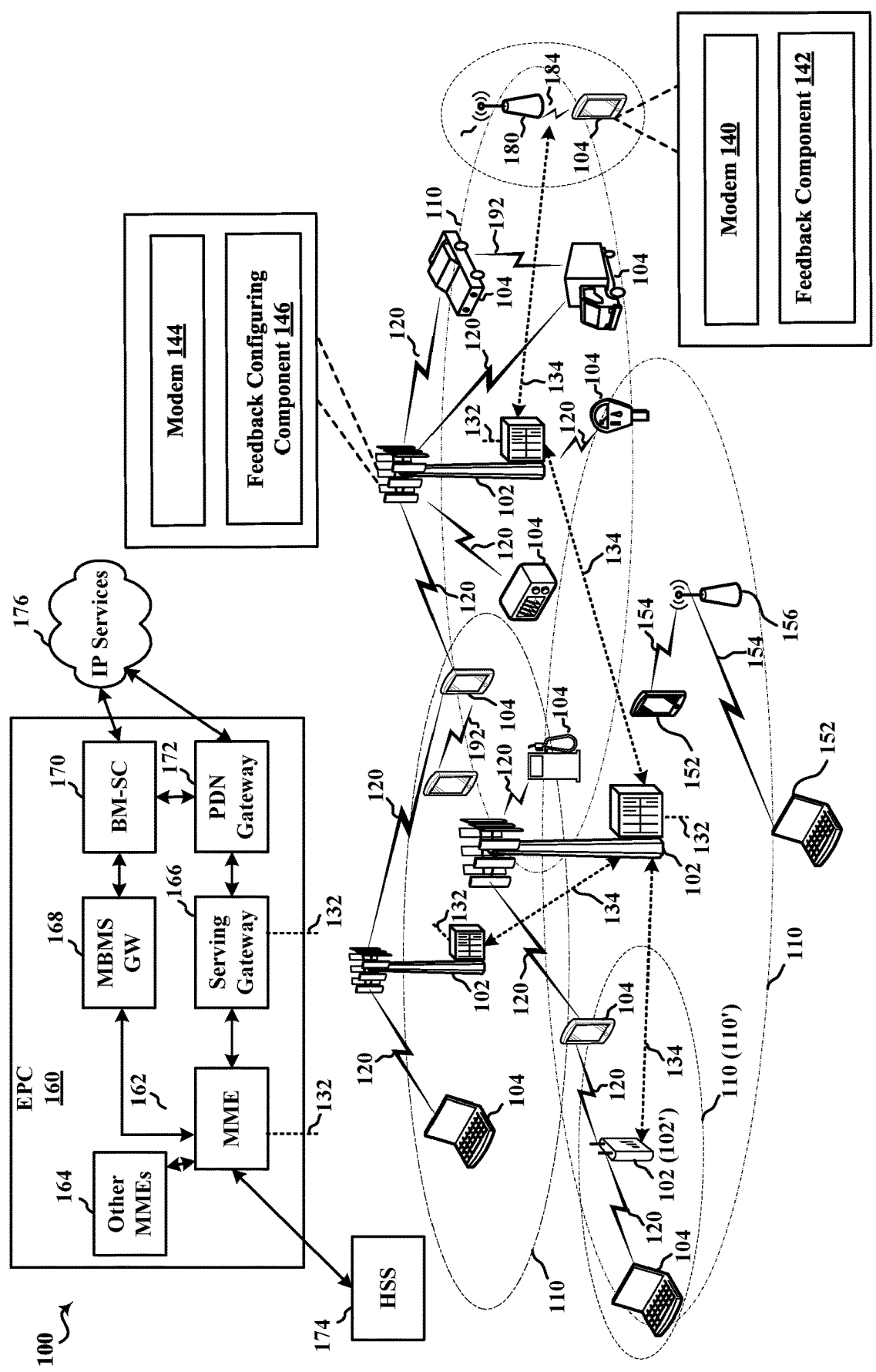
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Currently in fifth generation (5G) new radio (NR) networks, slot-based feedback is supported where feedback can be transmitted once per slot. This is due to the feedback codebook design where parameters such as K1 (e.g., the number of slots between when communications are received and when to transmit corresponding feedback) and downlink assignment index (DAI) (e.g., the number of slots for which to transmit corresponding feedback) are slot-based. In 5G NR networks where lower latency is desired, such as in networks configured for ultra-reliable-low latency communications (URLLC), additional feedback transmissions per slot may be desirable in an attempt to satisfy the reliability metrics.

The described features generally relate to mechanisms for transmitting more than one feedback transmission per slot. In one example, a slot can be divided into multiple virtual mini-slots for the purpose of determining and/or communicating feedback. For example, the virtual mini-slot partitioning can be different per slot, and feedback can be determined for communications received up to a certain symbol in each virtual mini-slot. Feedback can be accordingly transmitted for the communications in each virtual mini-slot to achieve multiple feedback transmissions for the associated slot. In one example, the codebook for determining how to generate the feedback and/or when to transmit the feedback, which can be based on the virtual mini-slot partitioning, can be dynamically configured (e.g., by a base station that configures the device for wireless communications). In another example, the codebook can be semi-statically determined (e.g., by the device transmitting feedback). In yet another example, the virtual mini-slots partitioning can be defined for control and/or shared data channel resource allocation as well. In this example, feedback can be accordingly transmitted for each virtual mini-slot using similar mechanisms and parameters used for slot-based feedback, where associated parameters can be defined based on mini-slot.

In another example, feedback can be transmitted for each received communication within a slot, which may result in transmitting multiple feedback transmission in the slot. In this example, where communications are received over multiple component carriers in carrier aggregation, feedback for the communications can be multiplexed into a single feedback transmission (e.g., where the communications have the same last symbol within the slot).

The described features will be presented in more detail below with reference to FIGS. 1-12.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network and a feedback component 142 for transmitting multiple feedback transmissions in a slot, as described above and further herein. Further, wireless communication access network 100, also referred to as a wireless wide area network (WWAN), includes at least one base station 102 via which the UE 104 can communicate with one or more nodes of the wireless communication access network to communicate data corresponding to the service. The base station 102 can include a millimeter wave (mmW) base station 180, such as a gNB, which can also have a modem 144 for communicating in the wireless network and a feedback configuring component 146 for configuring a UE 104 to transmit multiple feedback transmissions in a slot.

The one or more UEs 104 and/or the one or more base stations 102 may communicate with other UEs and/or other base stations via an Evolved Packet Core (EPC) 160 or a 5G core. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. In other examples, a 5G core may include other components or functions that may be accessible by the base station 102 over a backhaul link in a 5G wireless network, such as a Access and Mobility Management Function (AMF) a Session Management Function (SMF), a User Plane Function (UPF), a Unified Data Management (UDM), etc.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a UE 104 can transmit multiple feedback transmissions for wireless communications received from a base station 102 in a given slot. In this example, the base station 102 can configure the UE 104 for slot-based wireless communications where each slot can have a defined number of symbols (e.g., orthogonal frequency division multiplexing (OFDM) symbols, single-carrier frequency division multiplexing (SC-FDM) symbols, etc.), such as 14 symbols per slot (e.g., for normal cyclic prefix (CP)). For example, 5G NR wireless communication technologies can employ such slot-based wireless communications, and are typically associated with transmitting feedback once per slot. Aspects described herein, however, facilitate configuring the UE 104 to transmit feedback multiple times in one slot, which can allow for reducing latency associated with communications, improving reliability of the communications, etc. For example, feedback configuring component 146 can configure the UE 104 to transmit feedback corresponding to symbols in each of multiple virtual mini-slots defined in a given slot. In other examples, feedback configuring component 146 can configure the UE 104 to transmit feedback for each of multiple communications transmitted within a slot (e.g., transmitted over different symbols of the slot or otherwise).

Turning now to FIGS. 2-12, aspects are depicted with reference to one or more components and one or more methods that may perform the actions or operations described herein, where aspects in dashed line may be optional. Although the operations described below in FIGS. 4, 5, 8, 10, and 11 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
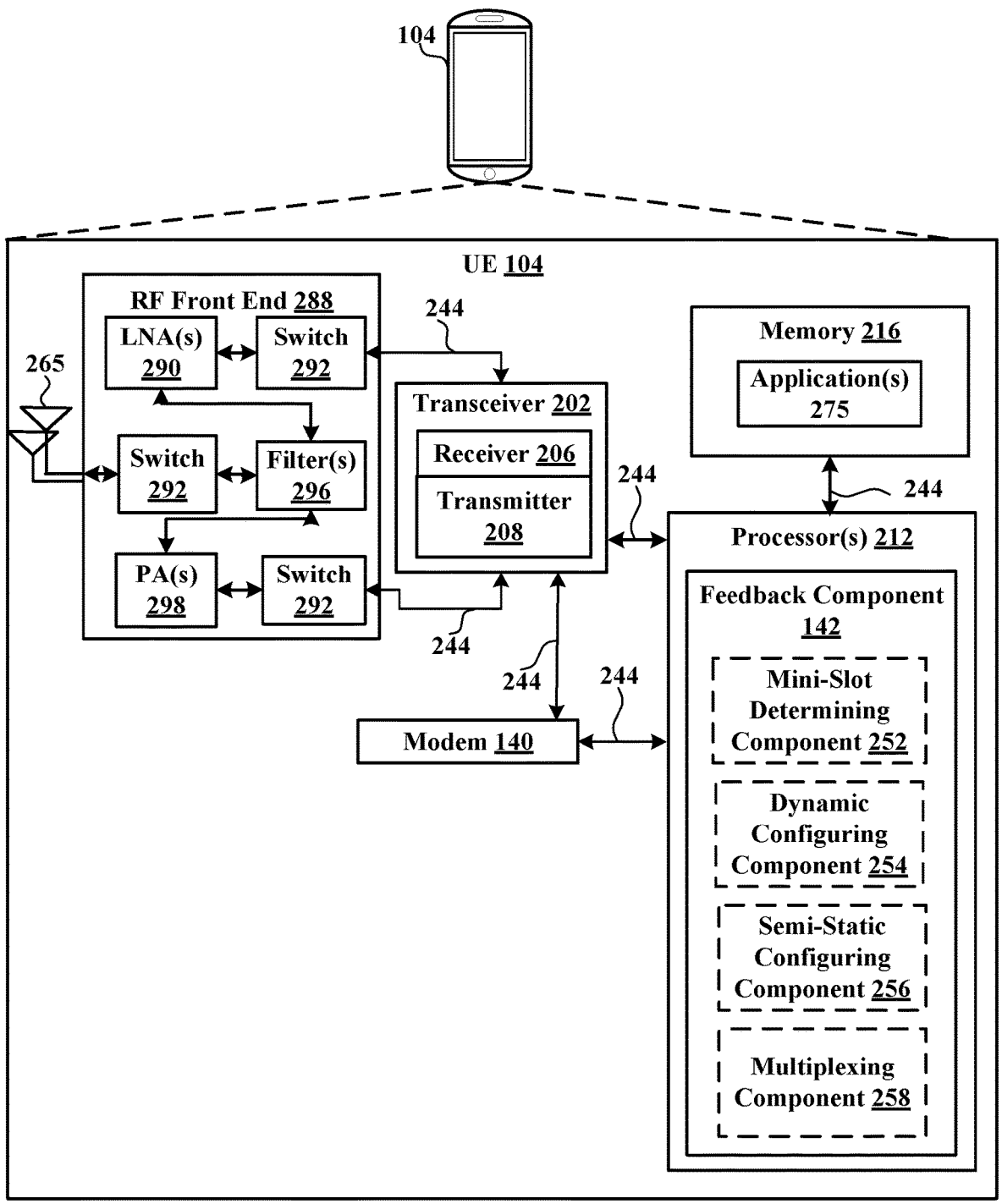
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or feedback component 142 to enable one or more of the functions described herein related to transmitting multiple feedback transmissions in a slot.

In an aspect, the one or more processors 212 can include a modem 140 and/or can be part of the modem 140 that uses one or more modem processors. Thus, the various functions related to feedback component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with feedback component 142 may be performed by transceiver 202.

Also, memory 216 may be configured to store data used herein and/or local versions of applications 275 or feedback component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining feedback component 142 and/or one or more of its subcomponents, and/or data associated therewith, when UE 104 is operating at least one processor 212 to execute feedback component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, feedback component 142 can optionally include mini-slot determining component 252 for determining multiple virtual mini-slots into which a slot is partitioned, a dynamic configuring component 254 for determining a dynamic configuration of feedback parameters for transmitting feedback for multiple ones of the virtual mini-slots within the slot, a semi-static configuring component 256 for determining a semi-static configuration of multiple opportunities for which to report feedback in a slot, and/or a multiplexing component 258 for multiplexing feedback related to multiple communications in multiple mini-slots or symbols within a slot.

In an aspect, the processor(s) 212 may correspond to one or more of the processors described in connection with the UE in FIG. 12. Similarly, the memory 216 may correspond to the memory described in connection with the UE in FIG. 12.

Figure 3:
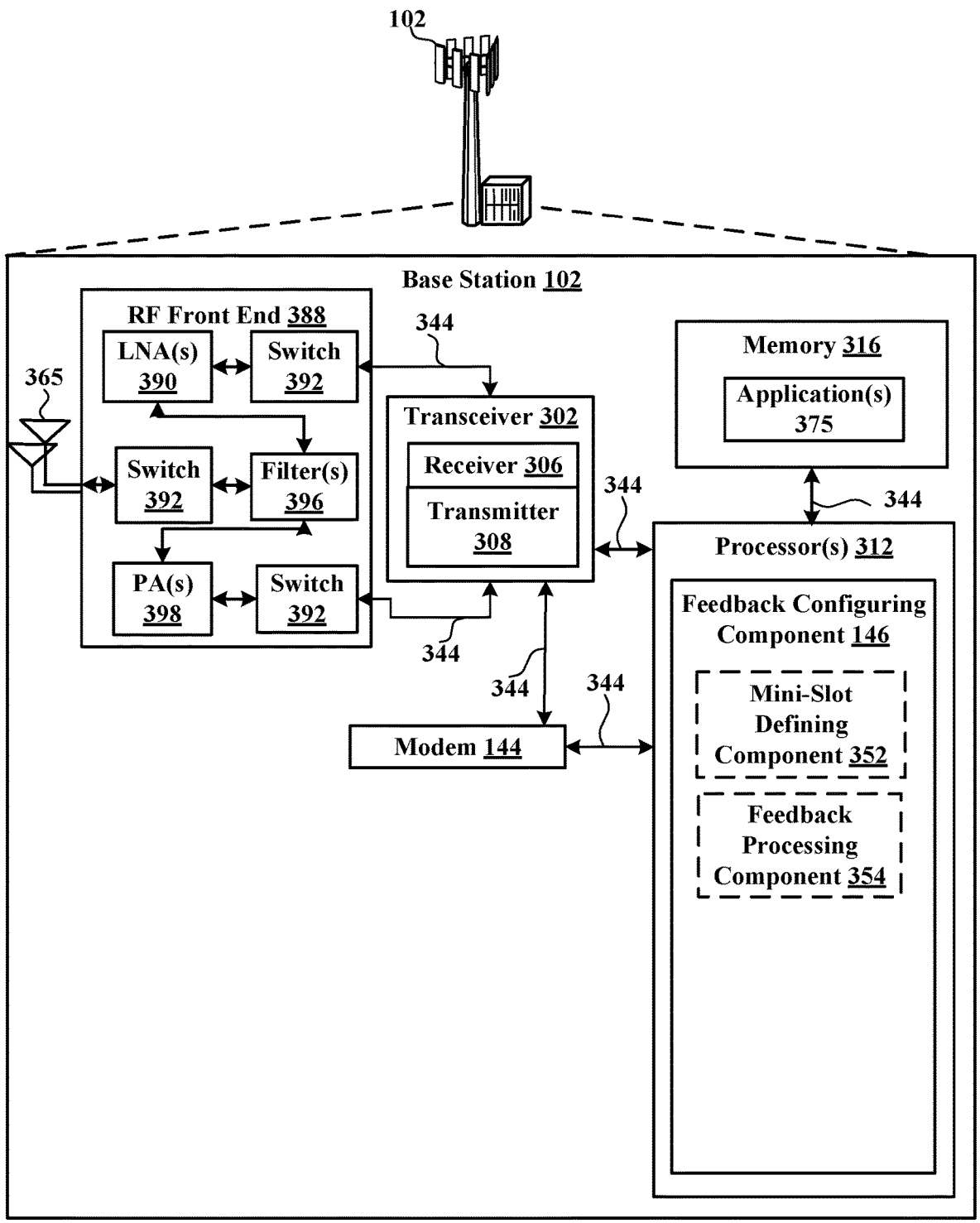
FIG. 3 is a block diagram illustrating an example of a base station, in accordance with various aspects of the present disclosure.

Referring to FIG. 3, one example of an implementation of base station 102 may include a variety of components, some of which have already been described above, but including components such as one or more processors 312 and memory 316 and transceiver 302 in communication via one or more buses 344, which may operate in conjunction with modem 144 and feedback configuring component 146 for configuring one or more UEs 104 to transmit multiple feedback transmissions within a slot.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, feedback configuring component 146 can optionally include a mini-slot defining component 352 for indicating a partitioning of a slot into multiple virtual mini-slots, at least for the purpose of transmitting feedback, and/or a feedback processing component 354 for processing feedback received from a UE 104 to determine communications to which the feedback relates.

In an aspect, the processor(s) 312 may correspond to one or more of the processors described in connection with the base station in FIG. 12. Similarly, the memory 316 may correspond to the memory described in connection with the base station in FIG. 12.

Figure 4:
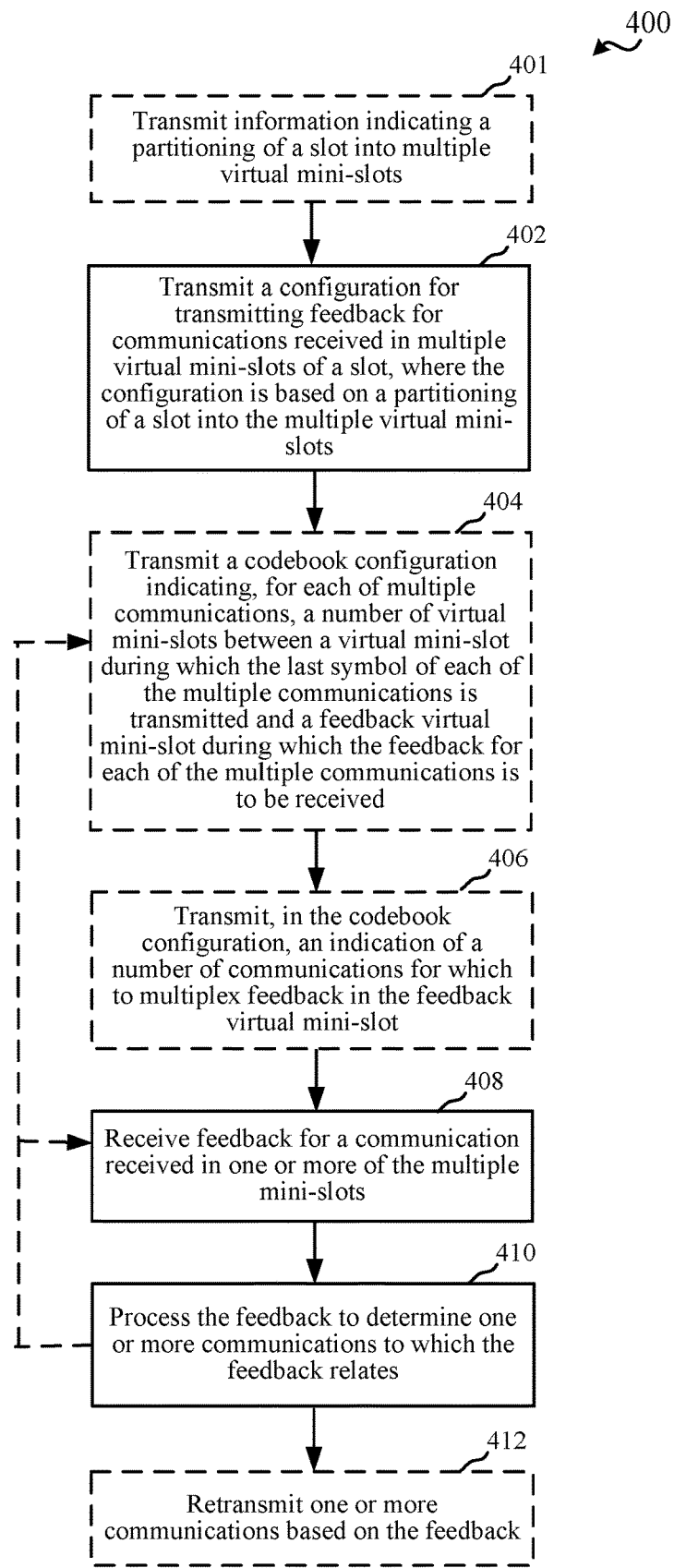
FIG. 4 is a flow chart illustrating an example of a method for transmitting multiple feedback transmissions in a slot, in accordance with various aspects of the present disclosure.
Figure 5:
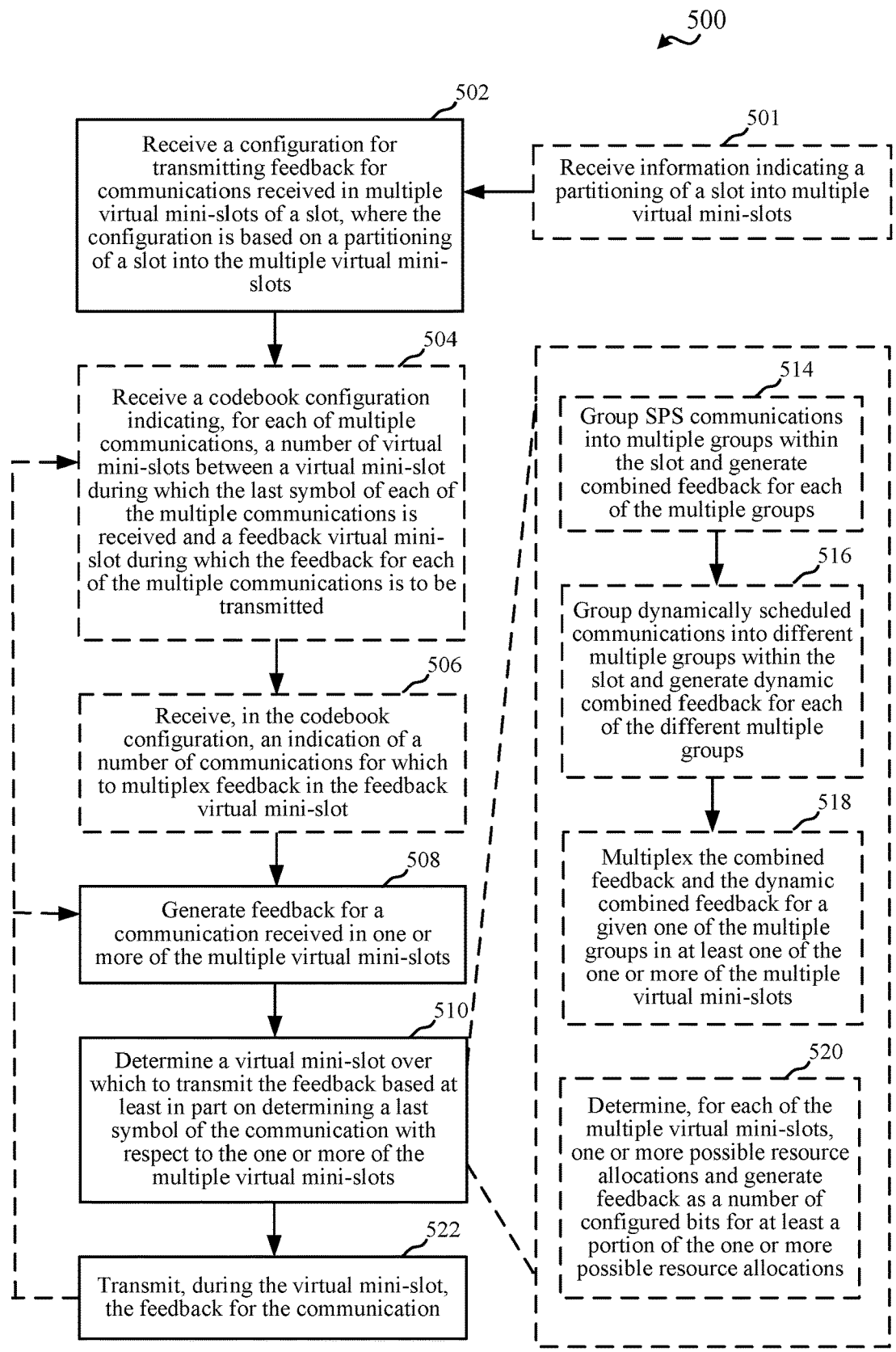
FIG. 5 is a flow chart illustrating an example of a method for configuring a device to transmit multiple feedback transmissions in a slot, in accordance with various aspects of the present disclosure.

FIG. 4 illustrates a flow chart of an example of a method 400 for receiving multiple feedback transmissions for communications sent in a slot. In an example, a base station 102 can perform the functions described in method 400 using one or more of the components described in FIGS. 1 and 3. FIG. 5 illustrates a flow chart of an example of a method 500 for transmitting multiple feedback transmissions for communications received in a slot. In an example, a UE 104 can perform the functions described in method 500 using one or more of the components described in FIGS. 1-2. Though methods 400 and 500 are described together below, each of the methods 400 and 500 can be operated independently without requiring steps from the other method. Rather, the methods 400 and 500 are described in conjunction with one another for ease of explanation.

In method 400, optionally at Block 401, information indicating a partitioning of a slot into multiple virtual mini-slots can be transmitted. In an aspect, mini-slot defining component 352, e.g., in conjunction with processor(s) 312, memory 316, transceiver 302, feedback configuring component 146, etc., can transmit the information indicating the partitioning of the slot into the multiple virtual mini-slots. In method 500, optionally at Block 502, information indicating a partitioning of a slot into multiple virtual mini-slots can be received. In an aspect, mini-slot determining component 252, e.g., in conjunction with processor(s) 212, memory 216, transceiver 202, feedback component 142, etc., can receive the information indicating the partitioning of the slot into the multiple virtual mini-slots, which can be the information as transmitted by the base station 102. In one example, the information can be communicated via RRC signaling, in DCI, etc.

In method 400, at Block 402, a configuration can be transmitted for transmitting feedback for communications received in multiple virtual mini-slots of a slot, where the configuration is based on a partitioning of a slot into the multiple virtual mini-slots. In an aspect, mini-slot defining component 352, e.g., in conjunction with processor(s) 312, memory 316, transceiver 302, feedback configuring component 146, etc., can transmit the configuration for transmitting feedback for communications received in multiple virtual mini-slots of the slot, where the configuration is based on a partitioning of a slot into the multiple virtual mini-slots. In method 500, at Block 502, a configuration can be received for transmitting feedback for communications received in multiple virtual mini-slots of a slot, where the configuration is based on a partitioning of a slot into the multiple virtual mini-slots. In an aspect, mini-slot determining component 252, e.g., in conjunction with processor(s) 212, memory 216, transceiver 202, feedback component 142, etc., can receive the configuration for transmitting the feedback for communications received in the multiple virtual mini-slots of the slot, where the configuration is based on a partitioning of a slot into the multiple virtual mini-slots. In one example, the configuration may specify the partitioning of the slot into the virtual mini-slots. In other examples, the partitioning may be known or received by the UE 104 and/or base station 102 based on a stored or communicated configuration (e.g., in the communicated information described above in reference to Blocks 401 and/or 501).

Figure 6A:
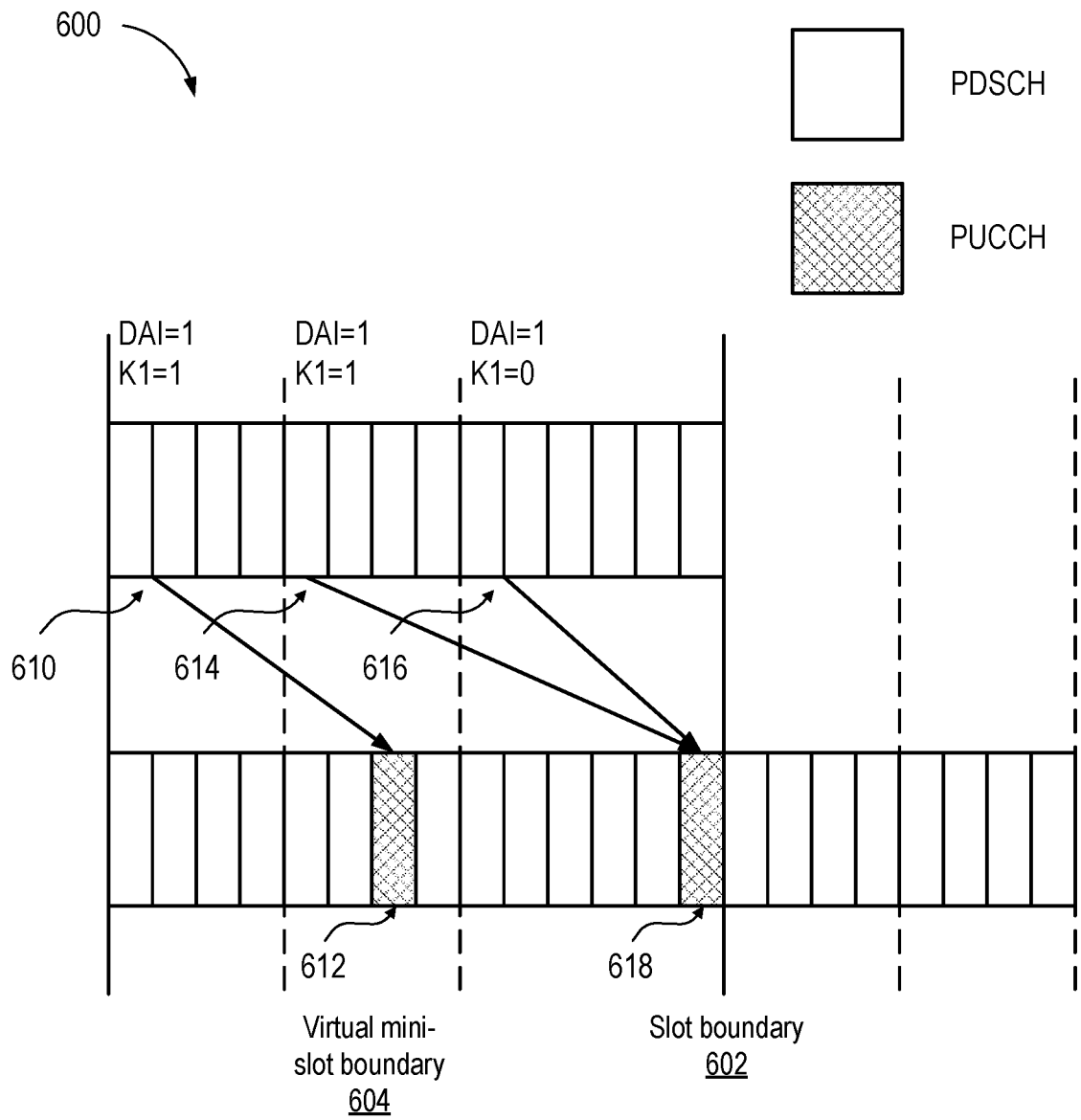
FIG. 6A illustrates an example of a resource allocation for transmitting multiple feedback transmissions in a slot, in accordance with various aspects of the present disclosure.

One specific non-limiting example of a virtual mini-slot partitioning is depicted by the collection of symbols 600 in FIG. 6A. Symbols 600 include a slot indicated between the first symbol and the slot boundary 602, which includes 14 OFDM symbols. The slot includes two virtual slot boundaries 604 indicated by dotted line, for a total of three virtual mini-slots. In this example, the first mini-slot can be the first four symbols in the slot, the second mini-slot can be the next four symbols in the slot, and the third mini-slot can be the next six symbols in the slot. Where the information regarding the partitioning is communicated or the configuration is used to indicate the partitioning as described above, for example, the information and/or configuration can specify the mini-slot partitioning in this example by using a variety of possible parameters. In one example, a n-bit mask or bitmap can be used to indicate the partitioning, where n is the number of symbols in the slot (e.g., length 14), such as [1,0,0,0,1,0,0,0,1,0,0,0,0,0] to indicate the three virtual mini-slots with duration [4,4,6], respectively. In another example, the configuration can indicate the partitioning as the set [4,4,6], which can indicate the first mini-slot as the first four symbols, the second as the next four symbols, and the third as the last six symbols. Moreover, the partitioning can vary across slot, and the configuration can be configured for each slot, for a collection of a number of consecutive slots, and/or the like. For example, the configuration may indicate [4,4,6] for slot one, [7,7] for slot two where slot two has two mini-slots each of seven symbols, [3,3,2,3,3] for slot three where slot three has five mini-slots of three, three, two, three, and three symbols, respectively, etc. In another example, the configuration may indicate that every virtual mini-slot contains 7 symbols, and thus a [7,7] partitioning is used for every slot. Moreover, the configuration may be transmitted (e.g., by the base station 102) by at least one of using radio resource control (RRC) or other higher layer or non-access stratum (NAS) signaling to configure a fixed pattern for each slot or for every L number of slots, using downlink control information (DCI) signaling to dynamically indicate a specific pattern for a consecutive number of slots, etc.

In examples described herein, the UE 104 can determine and transmit one feedback transmission per virtual mini-slot, which can result in multiple feedback transmissions in a given slot. In one example, the virtual mini-slot partitioning may be used for defining feedback transmissions only, such that shared channel resource allocation (e.g., physical downlink shared channel (PDSCH) and physical uplink shared channel (PUSCH) resource allocation) can follow a different scheduling granularity, parameters, etc. than that indicated by the virtual mini-slots. In another example, however, shared channel resource allocation may use the virtual mini-slot partitioning, as described herein, to facilitate multiple feedback transmissions for communications received in a slot. Moreover, for example, the uplink control channel carrying the feedback (e.g., physical uplink control channel (PUCCH)) can be transmitted across virtual mini-slot boundary and may or may not cross the slot boundary. Additionally, for example, the feedback may include hybrid automatic repeat request (HARQ) acknowledgement (HARQ-ACK) feedback and/or other types of feedback.

In method 400, optionally at Block 404, a codebook configuration can be transmitted indicating, for each of multiple communications, a number of virtual mini-slots between a virtual mini-slot during which a last symbol of each of the multiple communications is transmitted and a feedback virtual mini-slot during which the feedback for each of the multiple communications is to be received. In an aspect, feedback configuring component 146, e.g., in conjunction with processor(s) 312, memory 316, transceiver 302, etc., can transmit the codebook configuration indicating, for each of the multiple communications, the number of virtual mini-slots between the virtual mini-slot during which the last symbol of each of the multiple communications is transmitted and the feedback virtual mini-slot during which the feedback for each of the multiple communications is to be received. In method 500, optionally at Block 504, a codebook configuration can be received indicating, for each of multiple communications, a number of virtual mini-slots between a virtual mini-slot during which a last symbol of each of the multiple communications is received and a feedback virtual mini-slot during which the feedback for each of the multiple communications is to be transmitted. In an aspect, dynamic configuring component 254, e.g., in conjunction with processor(s) 212, memory 216, transceiver 202, feedback component 142, etc., can receive the codebook configuration indicating, for each of multiple communications, a number of virtual mini-slots between a virtual mini-slot during which a last symbol of each of the multiple communications is received and a feedback virtual mini-slot during which the feedback for each of the multiple communications is to be transmitted. For example, the number of virtual mini-slots between a virtual mini-slot during which a last symbol of each of the multiple communications is received and a feedback virtual mini-slot during which the feedback for each of the multiple communications is to be transmitted can be similar to a K1 value used in other wireless communication technologies to define a number of subframes or slots between which the communications are received and the feedback for the communications is to be transmitted by the UE. In this example, however, the number can correspond to a number of virtual mini-slots based on the partition of virtual mini-slots in the slot (and/or in subsequent slots). This number can be referred to hereinafter as "K1."

In method 400, optionally at Block 406, an indication of a number of communications for which to multiplex feedback in the feedback virtual mini-slot can be transmitted in the codebook configuration. In an aspect, feedback configuring component 146, e.g., in conjunction with processor(s) 312, memory 316, transceiver 302, etc., can transmit, in the codebook configuration, the indication of the number of communications for which to multiplex feedback in the feedback virtual mini-slot. In method 500, optionally at Block 506, an indication of a number of communications for which to multiplex feedback in the feedback virtual mini-slot can be transmitted in the codebook configuration. In an aspect, dynamic configuring component 254, e.g., in conjunction with processor(s) 212, memory 216, transceiver 202, feedback component 142, etc., can receive, in the codebook configuration, the indication of the number of communications for which to multiplex feedback in the feedback virtual mini-slot. For example, the number of communications for which to multiplex feedback in the feedback virtual mini-slot can be similar to a DAI value used in other wireless communication technologies to define the number of communications to multiplex feedback in a subframe or slot. In this example, however, the number can correspond to the partition of virtual mini-slots in the slot (and/or in subsequent slots). This number can be referred to hereinafter as "DAI."

In any case, for example, feedback configuring component 146 can transmit the codebook configuration, including K1 and DAI, in DCI signals to the UE 104, and dynamic configuring component 254 can accordingly receive the configuration and determine communications for which to multiplex feedback, and the virtual mini-slot during which to transmit the multiplexed feedback. For example, for a zero value of Kl, feedback configuring component 146 can transmit feedback for associated communications in the same virtual mini-slot as the corresponding last OFDM symbol of the PDSCH for which feedback is to be reported, and for a one value of K1, feedback configuring component 146 can transmit feedback in the next virtual mini-slot. In addition, the codebook configuration can indicate a resource over which to transmit the feedback, such as an ACK resource indicator (ARI) which may include a PUCCH resource indicator (PRI) in NR, which may include an indication of a starting symbol of the feedback transmission within a virtual mini-slot (e.g., a number of symbols relative to the start of the virtual mini-slot), a frequency resource over the symbol, and/or the like.

In method 500, at Block 508, feedback can be generated for a communication received in one or more of the multiple virtual mini-slots. In an aspect, feedback component 142, e.g., in conjunction with processor(s) 212, memory 216, transceiver 202, etc., can generate the feedback for the communication received in the one or more of the multiple virtual mini-slots. For example, generating the feedback can include generating HARQ ACK/NACK bits for communications received (or scheduled but not received) in multiple virtual mini-slots and/or other feedback for the communications. For example, the HARQ ACK/NACK bits can be used to indicate whether the communication was received and properly decoded (e.g., whether a cyclic redundancy check passed). A bit or bits for each communication (and/or scheduled communication) can be transmitted back to the base station 102 to allow the base station to possibly retransmit the communication if needed, as described, further herein.

In method 500, at Block 510, a virtual mini-slot over which to transmit the feedback can be determined based at least in part on determining a last symbol of the communication with respect to one or more of the multiple virtual mini-slots. In an aspect, feedback component 142, e.g., in conjunction with processor(s) 212, memory 216, transceiver 202, etc., can determine the virtual mini-slot over which to transmit the feedback based at least in part on determining the last symbol of the communication with respect to the one or more of the virtual mini-slots. For example, determining the feedback virtual mini-slot can include multiple different actions, as described in further detail herein, such that feedback can be generated and transmitted for communications received in multiple virtual mini-slots.

Figure 6B:
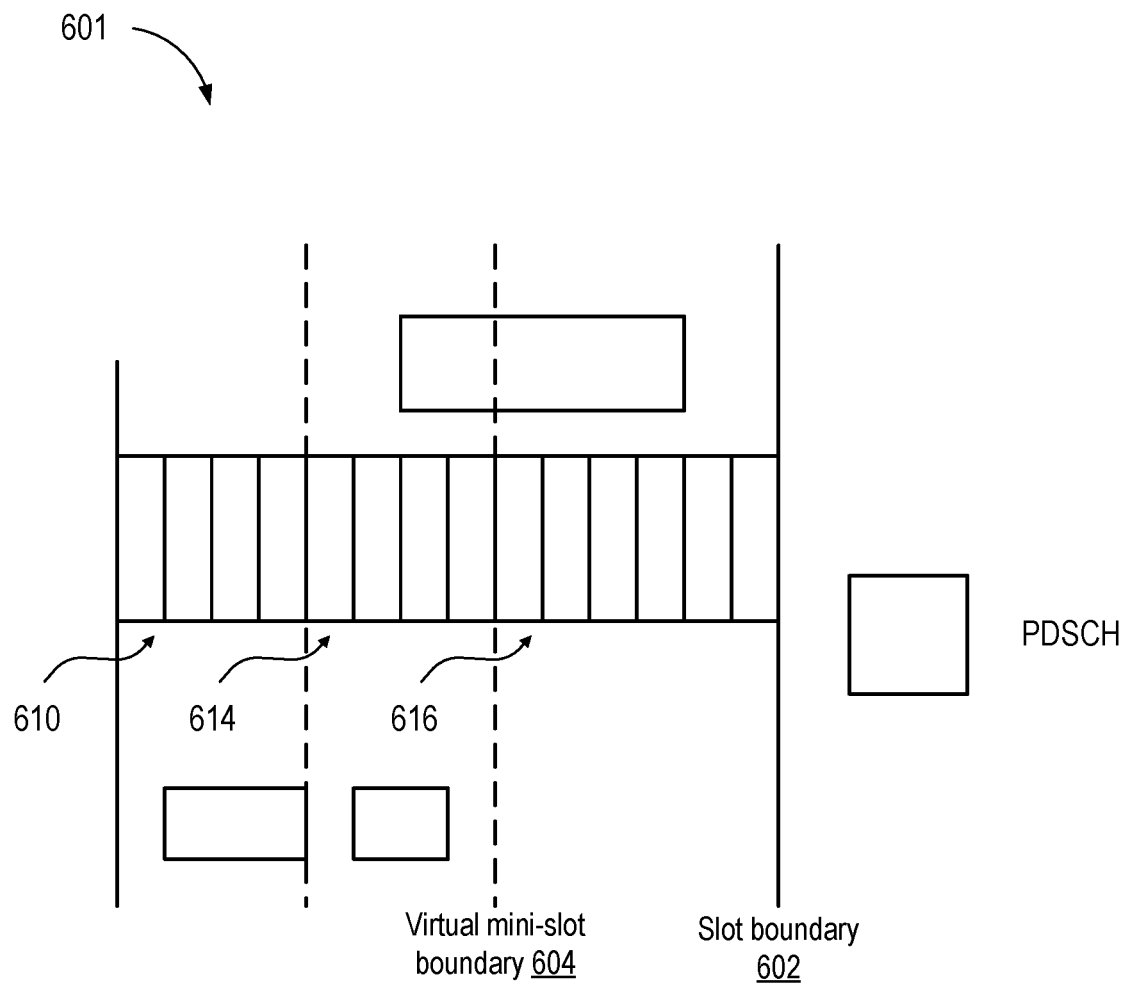
FIG. 6B illustrates an example of a resource allocation for transmitting multiple feedback transmissions in a slot based on a semi-statically configured codebook, in accordance with various aspects of the present disclosure.
Figure 7:
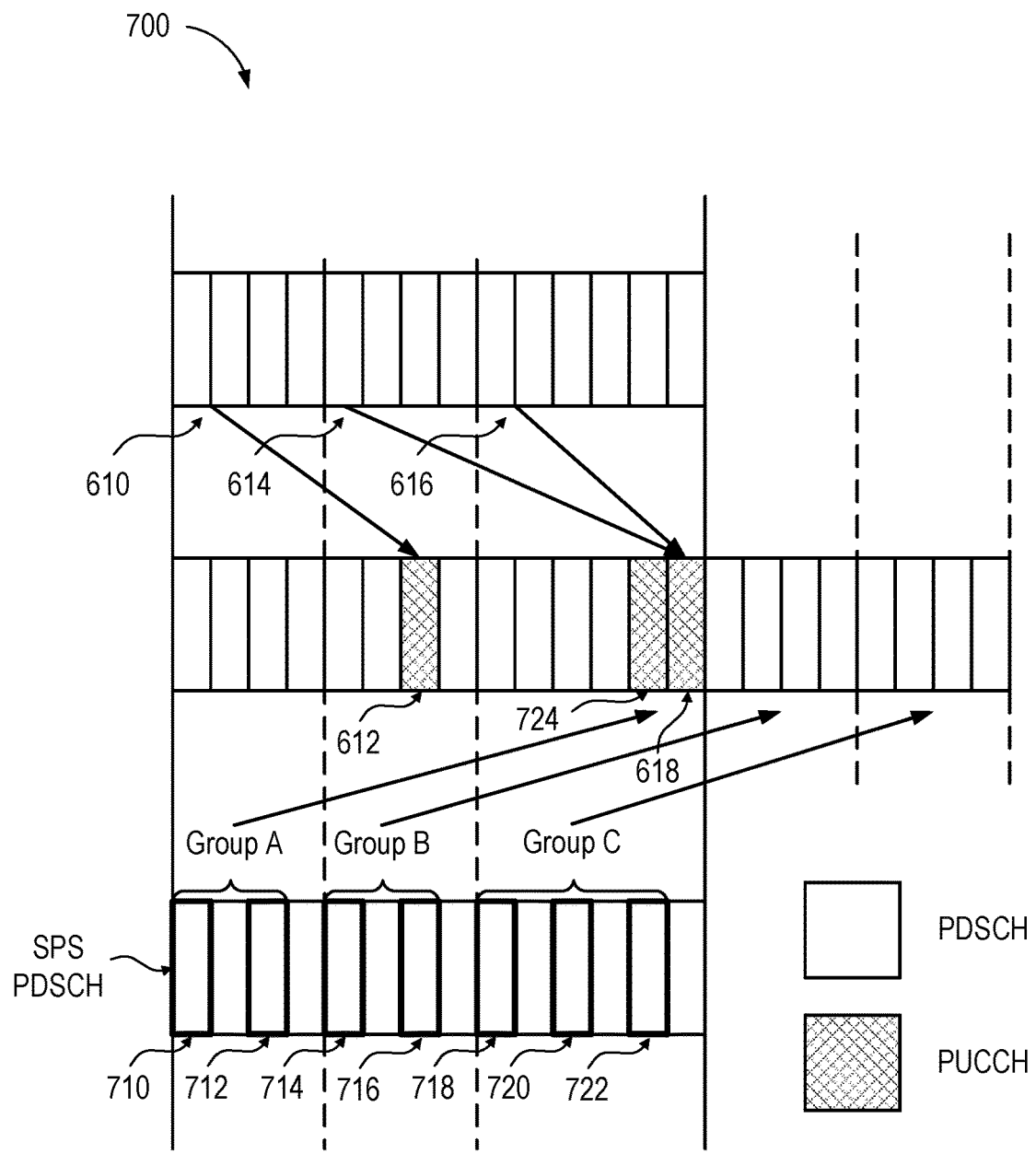
FIG. 7 illustrates an example of a resource allocation for transmitting multiple feedback transmissions for dynamically scheduled communications and semi-persistent scheduling communications in a slot, in accordance with various aspects of the present disclosure.

In one example, feedback component 142 can determine the virtual mini-slot over which to transmit feedback for a communication as the virtual mini-slot occurring K1 mini-slots after the mini-slot that includes the last symbol of the communication. Various examples are depicted in FIGS. 6A, 6B, and 7, where FIG. 6A is an example for dynamic HARQ-ACK codebook construction (which also can be known as Type 2 HARQ-ACK codebook in NR), and FIG. 6B is an example for semi-static HARQ-ACK codebook construction (which can be known as Type 1 HARQ-ACK codebook in NR). In one example, a communication can be received in symbols 610. Dynamic configuring component 254 can receive a codebook configuration indicating a K1 value of one for this communication, which indicates to transmit feedback in the next virtual mini-slot. Based on this value and on the virtual mini-slot configuration, for example, feedback component 142 can determine the virtual mini-slot over which to transmit feedback for this communication to be the virtual mini-slot that includes symbol 612, which can correspond to a PUCCH transmission opportunity for the next virtual mini-slot after the last symbol of the communication (e.g., the last symbol in symbols 610) is received.

In another example depicted in FIG. 6A, two communications transmitted in one or more virtual mini-slots of a slot can have a value of K1 that results in transmitting feedback for the two communications in the same virtual mini-slot. For example, dynamic configuring component 254 can receive a codebook configuration that indicates a K1 value of one for the communication received at symbols 614 and a K1 value of zero for the communication received at symbols 616. In this example, feedback component 142 can determine to transmit feedback for both of these communications in the same virtual mini-slot at symbol 618. In this regard, in one example, feedback component 142 can multiplex the feedback for the two communications, as described further herein, for transmitting in a PUCCH transmission opportunity in symbol 618. In addition, in this example, a communication can span virtual mini-slots, such as the communication in symbols 614. In this example, feedback component 142 can determine the virtual mini-slot for transmitting feedback for the communication based on a location of the last symbol in the communication, which results (along with the K1 value of one) in feedback being transmitted in the virtual mini-slot having symbol 618. For two communications, for example, if the corresponding K1 values indicate the UE to transmit the HARQ-ACK feedback in the same virtual mini-slot, then the UE can multiplex the two HARQ-ACK feedback into one transmission, and transmit the multiplexed feedback in the virtual mini-slot. In one example, the DAI value can be used to confirm the number of communications for which to provide feedback in a given mini-slot, and the DAI value can be derived based on K1 values, as explained above. Thus, for example, DAI can indicate/confirm the number of PDSCHs whose ACK/NACK feedback is to be multiplexed in one PUCCH transmission, and is incremented from PDCCH monitoring occasion to PDCCH monitoring occasion.

In one example, multiple feedback transmissions within a slot can also be provided for multiple semi-persistent scheduling (SPS) transmissions (e.g., along with dynamically scheduled transmissions or otherwise). For example, where a periodicity of downlink SPS matches a periodicity of scheduled PUCCH feedback transmission opportunities in a slot, there can be a one-to-one mapping of DL SPS transmissions over PDSCH with corresponding uplink feedback over PUCCH. Where, however, the number of DL SPS transmissions in a slot exceeds the number of scheduled PUCCH feedback transmission opportunities, feedback for the SPS transmissions over PDSCH can be multiplexed and/or bundled to achieve the number of PUCCH feedback transmission opportunities, and can be accordingly transmitted in the PUCCH feedback transmission opportunities. Where the SPS transmissions are sent with dynamically scheduled transmissions, feedback for both types of transmissions may also be multiplexed/bundled over a limited number of feedback transmission opportunities. An example is illustrated in FIG. 7, which illustrates another virtual mini-slot partitioning depicted by the collection of symbols 700.

As similarly described in reference to FIG. 6A, dynamic configuring component 254 can receive K1 values for transmissions in symbols 610, 614, 616, and can determine to transmit associated feedback, for transmission in symbol 610, in the virtual mini-slot corresponding to symbol 612, and for transmission in symbols 614 and 616, in the virtual mini-slot corresponding to symbol 618. In addition, the base station 102 can schedule and transmit SPS transmissions in respective symbols 710, 712, 714, 716, 718, 720, and 722. In an example, feedback component 142 can generate feedback for these communications as well, and can transmit the feedback along with the feedback for the dynamically scheduled transmissions of symbols 610, 614, 616.

For example, determining the virtual mini-slot over which to transmit feedback for the SPS communication can optionally include, at Block 514, grouping SPS communications into multiple groups within the slot and generating combined feedback for each of the multiple groups. In an aspect, feedback component 142, e.g., in conjunction with processor(s) 212, memory 216, transceiver 202, etc., can group the SPS communications into multiple groups within the slot and generate combined feedback for each of the multiple groups. In an example, feedback component 142 can group the SPS communications based on an explicit signaling of the grouping received from the base station 102 (e.g., via a RRC or higher layer communication). In another example, feedback component 142 can group the SPS communications based on the virtual mini-slot partitioning (e.g., based on determining SPS communications having their last symbol in the same virtual mini-slot). Thus, for example, feedback component 142 can group the SPS communications 710, 712 in to a first group (Group A), the SPS communications 714, 716 into a second group (Group B), and the SPS communications 718, 720, and 722 into a third group (Group C), in the example of FIG. 7.

In addition, multiplexing component 258 can multiplex feedback for communications of each group, which can include generating a feedback that indicates all feedback values for the group of communications. In an example, this can include a map of values (e.g., a bitmap where each bit corresponds to a communication in the group), a single bundled value to indicate feedback for all communications (e.g., ACK if all communications have an ACK value or NACK if at least one communications has a NACK value), etc. Feedback component 142 can also determine, for example, when to send corresponding feedback. For example, feedback component 142 can determine to transmit feedback for the SPS communications in a next virtual mini-slot, two virtual mini-slots from the virtual mini-slot in which the SPS communications are received, etc. In an example, UE 104 can receive, from the base station 102, an activation DCI for the SPS communications, which can indicate a K1 for transmitting feedback for the SPS communications. This K1 value can be assumed for all SPS communications. In this example, feedback component 142 can use the K1 value to determine the virtual mini-slot for transmitting feedback for grouped SPS communications in the slot, and thus can add the K1 to a virtual mini-slot associated with a given group to determine the virtual mini-slot over which to transmit feedback for the group. As shown in FIG. 7, feedback component 142 can determine to send feedback for the SPS communications in Group A over the symbol 724 that is two virtual mini-slots away from the virtual mini-slot over which the Group A SPS communications are transmitted in symbols 710, 712. Thus, for example, the K1 value received in the activation DCI for the SPS communications may be 2. In addition, in this example, feedback component 142 can determine to send feedback for the SPS communications in Group B over a symbol in the next virtual mini-slot (e.g., 2 virtual mini-slots away from the virtual mini-slot within which Group B communications are received), and so on.

As described, where feedback component 142 determines to transmit feedback for dynamically scheduled communications (e.g., communications at symbols 614, 616) and SPS communications (e.g., Group A communications 710, 712) in the same virtual mini-slot, multiplexing component 258 can multiplex the feedback transmissions. Thus, for example, determining the virtual mini-slot over which to transmit feedback for the SPS communication can optionally include, at Block 516, grouping dynamically scheduled communications into different multiple groups within the slot and generating dynamic combined feedback for each of the different multiple groups. In an aspect, feedback component 142, e.g., in conjunction with processor(s) 212, memory 216, transceiver 202, etc., can group the dynamically scheduled communications into the different multiple groups within the slot and can generate the dynamic combined feedback for each of the different multiple groups. In an example, feedback component 142 can group the SPS communications based on an explicit signaling of the grouping received from the base station 102 (e.g., via a RRC or higher layer communication), and/or can group the communications as described above based on partitioning the virtual mini-slot partitioning (e.g., based on determining SPS communications having their last symbol in the same virtual mini-slot), etc. As described, this can include generating a map of feedback values for each communication, generating a single bundled feedback value, etc.

In addition, in this example, determining the virtual mini-slot over which to transmit feedback for the SPS communication can optionally include, at Block 518, multiplexing the combined feedback with the dynamic combined feedback for a given one of the multiple groups in at least one of the one or more multiple virtual mini-slots. In an aspect, multiplexing component 258, e.g., in conjunction with processor(s) 212, memory 216, transceiver 202, feedback component 142 etc., can multiplex the combined feedback with the dynamic combined feedback for the given one of the multiple groups in at least one of the one or more multiple virtual mini-slots. For example, multiplexing component 258 can append the feedback bits for the given one of the multiple groups (for SPS communications) to feedback bits of a given one of the different multiple groups (for dynamically scheduled communications), or vice versa. In another example, multiplexing component 258 can bundle the feedback bits for the given one of the multiple groups (for SPS communications) to feedback bits of a given one of the different multiple groups (for dynamically scheduled communications) into a single feedback value. In these examples, multiplexing component 258 can associate the groups where the virtual mini-slot over which it is determined to transmit feedback for the groups is the same virtual mini-slot. In one example, multiplexing component 258 may use a time-domain multiplexing to send the bits over symbols 724 and 618, may use time-domain bundling to bundle the bits into a single or multiple feedback transmissions in symbols 724 and 618, etc.

In yet another example, feedback component 142 can determine virtual mini-slots over which to transmit feedback using a semi-statically determined codebook at the UE 104. In this example, the UE 104 can determine possible PDSCH occasions within each virtual mini-slot. For example, the UE 104 can look at all possible time-domain resource allocations for PDSCH, and determine whether a particular time-domain resource allocation is a valid PDSCH occasion for a virtual mini-slot, if the last symbol of the resource allocation belongs to the virtual mini-slot, and if the resource allocation does not contradict the semi-static TDD UL-DL configuration received from the base station 102. Different allocations with same last symbol may be counted as one PDSCH occasion. In this example, the UE 104 can feedback Mbits for each possible PDSCH occasion, where M can be semi-statically configured. In one example, M=1, if each PDSCH contains only 1 transport block (TB). If no PDSCH is scheduled in a particular occasion, UE 104 can feedback MNACKs. Otherwise, UE 104 can feedback the actual decoding results. The feedback for all PDSCH occasions within certain period can be bundled together in one feedback bit. Alternatively, UE 104 may be configured with only one bit feedback per virtual mini-slot per component carrier (CC). In this example, the UE 104 does not expect to be scheduled with more than one PDSCH per virtual mini-slot per CC.

Thus, for example, determining the virtual mini-slot over which to transmit feedback for the SPS communication can optionally include, at Block 520, determining, for each of the multiple virtual mini-slots, one or more possible resource allocations and generating feedback as a number of configured bits for at least a portion of the one or more possible resource allocations. In an aspect, feedback component 142, e.g., in conjunction with processor(s) 212, memory 216, transceiver 202, etc., can determine, for each of the multiple virtual mini-slots, one or more possible resource allocations and generate feedback as a number of configured bits for at least a portion of the one or more possible resource allocations. For example, FIG. 6B illustrates an example of a semi-static codebook construction. For example, referring to resource allocation 601, feedback component 142 can determine that there are six possible time domain resource allocations in a slot, including 2 PDSCH allocations within the first virtual mini-slot, 2 PDSCH allocations within the second virtual mini-slot, and 2 PDSCH allocations within the third virtual mini-slot. The feedback component 142 may further determine that the semi-static codebook may include the feedback for PDSCH allocations within a given number of virtual mini-slots (which may also be based on the virtual mini-slot partitioning). In this example, feedback component 142 can generate feedback for each of the possible PDSCH allocations determined for each virtual mini-slot.

In method 500, at Block 522, the feedback for the communication can be transmitted during the virtual mini-slot. In an aspect, feedback component 142, e.g., in conjunction with processor(s) 212, memory 216, transceiver 202, etc., can transmit, during the virtual mini-slot, the feedback for the communication. For example, feedback component 142 can transmit the feedback as multiplexed, bundled, or otherwise in the determined mini-slot for the feedback, as described. In this example, feedback component 142 can transmit the feedback in an uplink transmission opportunity scheduled in the given mini-slot (e.g., over PUCCH resources indicated by the ARI in the mini-slot). In addition, method 500 can continue to Block 508 to generate feedback for additional communications received in other virtual mini-slots of the slot. Moreover, for example, method 500 can continue to Block 504 to receive codebook configurations for other communications in other virtual mini-slots of the slot, which can be used to generate additional feedback, etc.

In method 400, at Block 408, feedback can be received for a communication received in one or more of the multiple mini-slots. In an aspect, feedback processing component 354, e.g., in conjunction with processor(s) 312, memory 316, transceiver 302, feedback configuring component 146, etc., can receive feedback for the communication received in the one or more of the multiple mini-slots. As described, feedback processing component 354 can receive the feedback over symbol(s) configured for PUCCH transmissions.

In method 400, at Block 410, the feedback can be processed to determine one or more communications to which the feedback relates. In an aspect, feedback processing component 354, e.g., in conjunction with processor(s) 312, memory 316, transceiver 302, feedback configuring component 146, etc., can process the feedback to determine the one or more communications to which the feedback relates. For example, feedback processing component 354 can know or determine mechanisms used by the UE 104 to communicate the feedback based on a configuration sent to the UE 104 by feedback configuring component 146 or otherwise used by the UE 104 to generate and transmit the feedback. As described, for example, feedback configuring component 146 can have indicated to the UE 104 the K1 and/or DAI values, as described above. In addition, for example, where SPS transmissions were scheduled along with dynamically scheduled transmissions, feedback configuring component 146 can have indicated the grouping for the SPS transmissions and/or the dynamically scheduled transmissions such that feedback processing component 354 can accordingly determine which feedback corresponds to which SPS and/or dynamically scheduled PDSCH communication, etc. Moreover, for example, feedback configuring component 146 can indicate the resource over which to transmit the feedback, whether to and/or a mechanism for combining, multiplexing, or otherwise bundling the feedback, etc., and feedback processing component 354 can accordingly determine how to process the feedback value. In yet another example, feedback processing component 354 can know whether the UE 104 uses the semi-static codebook configuration, and can also determine the PDSCH transmission occasions, such to determine to which occasions the received feedback relates. In any case, feedback processing component 354 can accordingly process the feedback to determine whether a NACK is received for any communication (or communications if feedback is bundled).

In method 400, optionally at Block 410, one or more communications can be retransmitted based on the feedback. In an aspect, transceiver 302, e.g., in conjunction with processor(s) 312, memory 316, feedback configuring component 146, etc., can retransmit the one or more communications based on the feedback.

Figure 8:
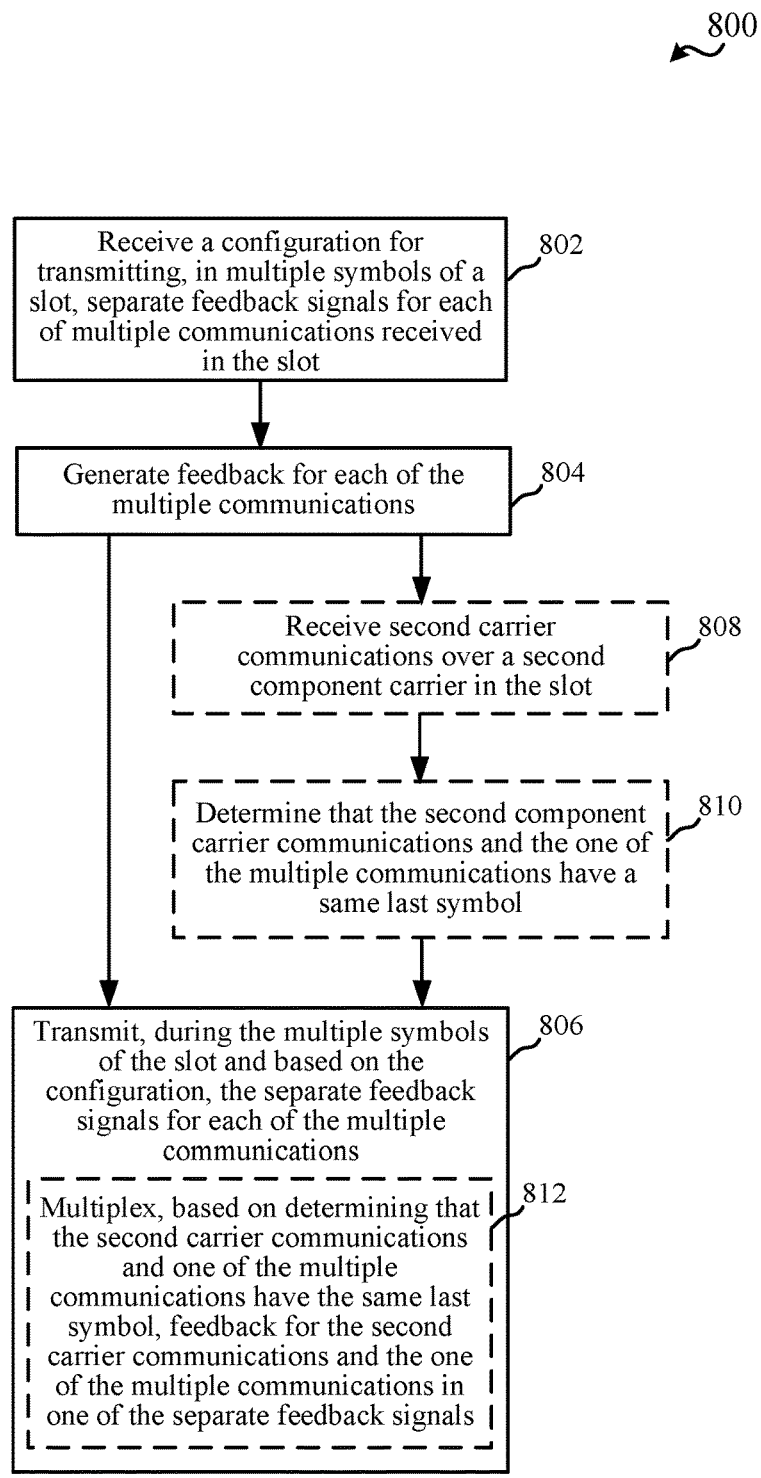
FIG. 8 is a flow chart illustrating an example of a method for transmitting separate feedback signals in a slot, in accordance with various aspects of the present disclosure.

FIG. 8 illustrates a flow chart of an example of a method 800 for transmitting multiple feedback transmissions for communications received in a slot. In an example, a UE 104 can perform the functions described in method 800 using one or more of the components described in FIGS. 1-2.

Figure 9:
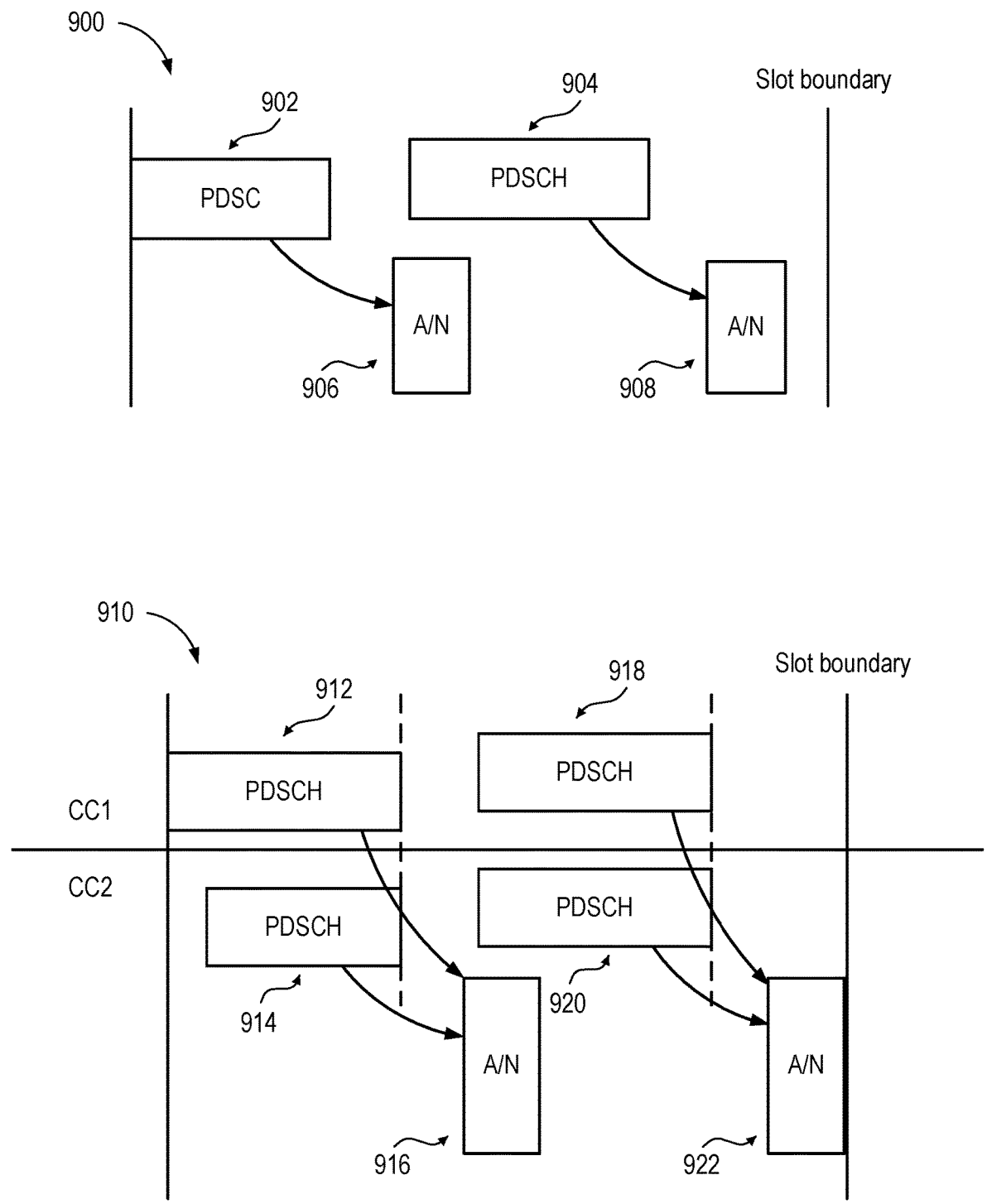
FIG. 9 illustrates an example of a resource allocation for transmitting separate feedback signals in a slot, in accordance with various aspects of the present disclosure.

In method 800, at Block 802, a configuration can be received for transmitting, in multiple symbols of a slot, separate feedback signals for each of multiple communications received in the slot. In an aspect, dynamic configuring component 254, e.g., in conjunction with processor(s) 212, memory 216, transceiver 202, feedback component 142, etc., can receive the configuration for transmitting, in the multiple symbols of the slot, the separate feedback signals for each of the multiple communications received in the slot. For example, the configuration can include a codebook configuration indicating K1 for each of multiple transmissions (e.g., PDSCH transmissions) in the slot, where K1 can be symbol-based or can otherwise indicate a time division over which to transmit feedback. Moreover, for example, the codebook configuration can indicate ARI to specify a symbol and/or a resource within the symbol over which to transmit feedback on the PUCCH. An example is shown in FIG. 9, which illustrates a resource allocation 900 having PDSCH allocations 902, 904 and associated respective PUCCH allocations 906, 908 for transmitting ACK/NACK (A/N) feedback.

In method 800, at Block 804, feedback can be generated for each of the multiple communications. In an aspect, feedback component 142, e.g., in conjunction with processor(s) 212, memory 216, transceiver 202, etc., can generate feedback for each of the multiple communications. As described, feedback component 142 can generate feedback to indicate whether the communication is successfully received (or not received) and/or processed (e.g., whether CRC passed).

In method 800, at Block 806, the separate feedback can be transmitted, during the multiple symbols of the slot, for each of the multiple communications. In an aspect, feedback component 142, e.g., in conjunction with processor(s) 212, memory 216, transceiver 202, etc., can transmit, during the multiple symbols of the slot and based on the configuration, the separate feedback signals for each of the multiple communications. For example, feedback component 142 can determine the appropriate symbols based on received scheduling of PUCCH transmissions, the K1 and/or ARI values in the received codebook configuration, etc. In the example of FIG. 9, as described, feedback component 142 can determine to transmit the feedback in symbols 906, 908.

In another example where multiple CCs are configured, the UE 104 may multiplex or otherwise bundle feedback for multiple transmissions, as described herein. For example, optionally at Block 808, second carrier communications can be received over a second CC in the slot. In an aspect, feedback component 142, e.g., in conjunction with processor(s) 212, memory 216, transceiver 202, etc., can receive the second carrier communications over the second CC in the slot. For example, the UE 104 can be configured for carrier aggregation (CA) in the slot such to concurrently receive communications from the base station 102 (and/or one or more other base stations) over different CCs in the slot. In one example, communications can be received over each CC using a different timeline or number/position of symbols within the slot.

In this example, optionally at Block 810, it can be determined that the second CC communications and the one of the multiple communications have a same last symbol. In an aspect, feedback component 142, e.g., in conjunction with processor(s) 212, memory 216, transceiver 202, etc., can determine that the second CC communications and the one of the multiple communications have a same last symbol in the slot. For example, feedback component 142 can determine that an index of the last symbol in each of the communications is the same. In one example, this can be a criterion for combining or otherwise bundling feedback for the multiple communications received over the separate CCs.

Thus, in this example, transmitting the separate feedback signals at Block 806 can optionally include, at Block 812, multiplexing, based on determining that the second carrier communications and one of the multiple communications have the same last symbol, feedback for the second carrier communications and the one of the multiple communications in one of the separate feedback signals. In an aspect, multiplexing component 258, e.g., in conjunction with processor(s) 212, memory 216, transceiver 202, feedback component 142, etc., can multiplex, based on determining that the second carrier communications and the one of the multiple communications have the same last symbol, the feedback for the second carrier communications and the one of the multiple communications in the one of the separate feedback signals. For example, the multiplexing can include appending feedback bits, bundling the feedback bits into one bit, etc., as described. In a specific example, the UE 104 can assume that overlapping (URLLC) PDSCHs on different CCs have the same time-domain resource allocation (or at least same last symbol), otherwise an error code can result. In addition, in a specific example, feedback configuring component 146 can indicate, and dynamic configuring component 254 can received, in the codebook configuration, a DAI to indicate how many PDSCHs were transmitted on the same time-domain resource over multiple carriers, such to determine the codebook size.

An example is shown in FIG. 9 at resource allocation 910. In this example, for PDSCH allocations 912, 914 having a same last symbol, feedback component 142 can multiplex feedback for transmitting in PUCCH transmission opportunity symbol 916. Similarly, for PDSCH allocations 918, 920 having a same last symbol, feedback component 142 can multiplex feedback for transmitting in PUCCH transmission opportunity symbol 922.

In other examples, partitioning of a slot into virtual mini-slots may be applied to shared data channel resource allocation (e.g., PDSCH and/or PUSCH allocation). As described above, for example, the partitioning can be uniform or non-uniform (e.g., 14-bit mask [1,0,0,0,1,0,0,0,1,0, 0,0,0,0] indicates that three virtual mini-slots is used in a slot, with duration of [4,4,6]), can vary across slots (e.g., the partition can be [4,4,6] in one slot, and [7,7] in a next slot), can be configured as a fixed partition pattern (e.g., [4,4,6]) for every slot, or every L slots (e.g., L=2, pattern=[4,4,6;7, 7])), and/or can be signaled in RRC or DCI to dynamically indicate a specific pattern for a consecutive number of slots, as described above. In these examples, other parameters related to resource allocation can become virtual min-slot based as opposed to slot-based, such as K0, which defines timing between a downlink grant and corresponding downlink data, K2, which defines timing between an uplink grant and corresponding uplink data, etc. In this example, PDSCH/PUSCH may have different slot-partition, and may be different from slot-partition of PUCCH as well. Alternatively, in an example, PDCCH can have one slot-partition, PUCCH and PUSCH share the same slot-partition. In addition, in an example, DCI can also signal the starting OFDM symbol relative to the start of virtual mini-slot. Examples for partitioning a slot into virtual mini-slots for the purposes of shared data channel resources are described in FIGS. 10 and 11.

Figure 10:
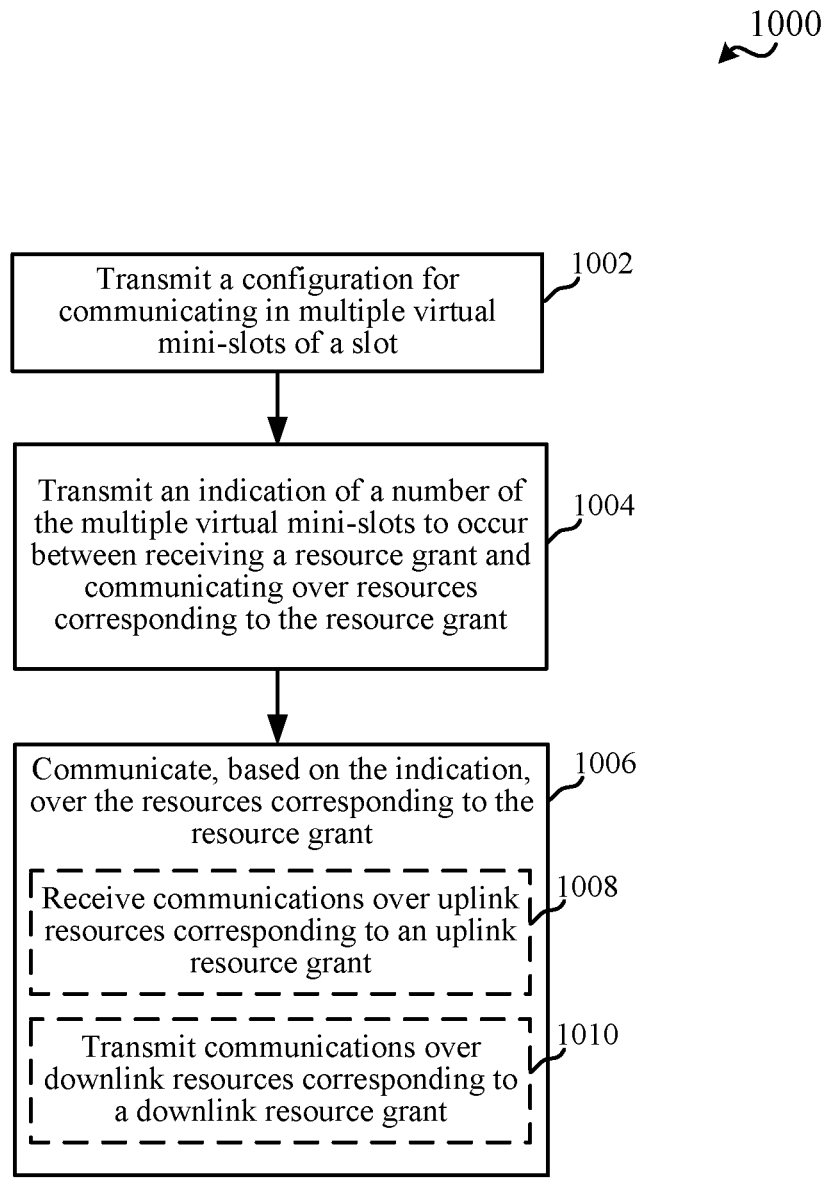
FIG. 10 is a flow chart illustrating an example of a method for configuring virtual mini-slots, in accordance with various aspects of the present disclosure.
Figure 11:
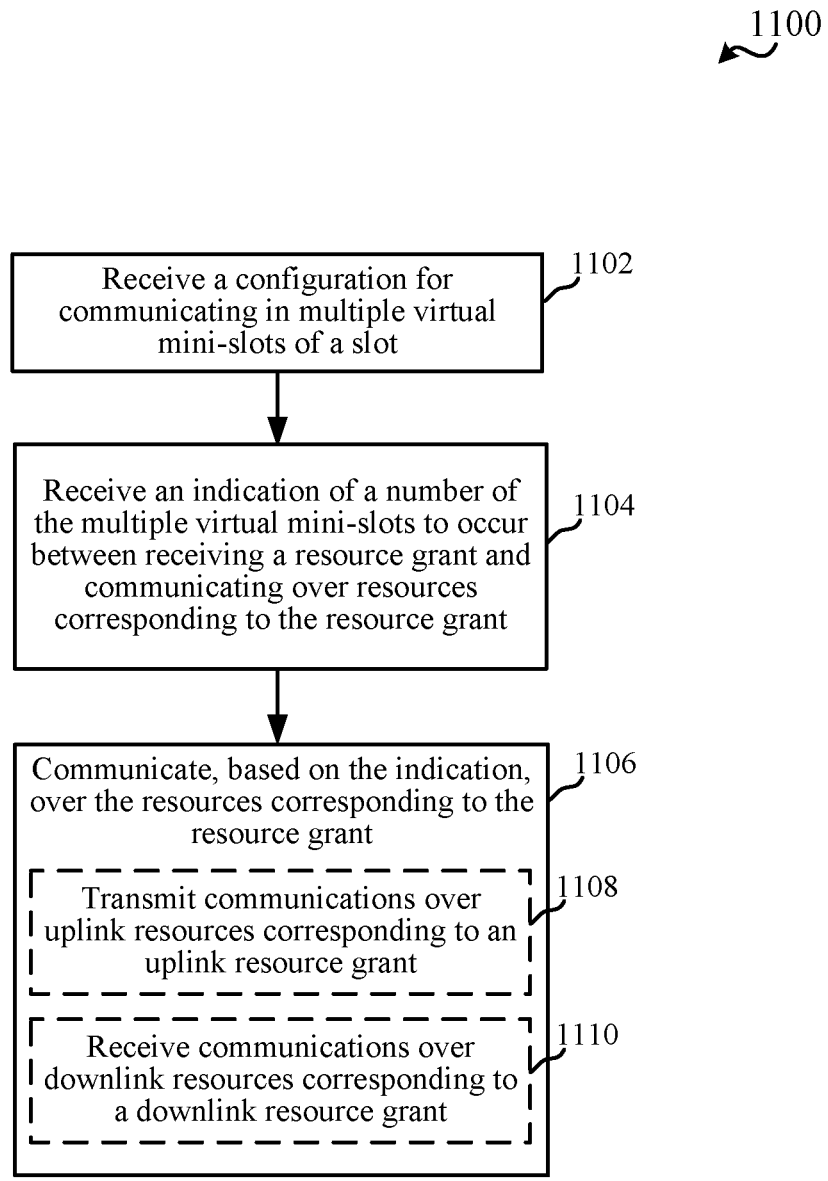
FIG. 11 is a flow chart illustrating an example of a method for communicating over virtual mini-slots, in accordance with various aspects of the present disclosure.

FIG. 10 illustrates a flow chart of an example of a method 1000 for transmitting a configuration for communicating in mini-slots. In an example, a base station 102 can perform the functions described in method 1000 using one or more of the components described in FIGS. 1 and 3. FIG. 11 illustrates a flow chart of an example of a method 1100 for communicating using mini-slots. In an example, a UE 104 can perform the functions described in method 1100 using one or more of the components described in FIGS. 1-2. Though methods 1000 and 1100 are described together below, each of the methods 1000 and 1100 can be operated independently without requiring steps from the other method. Rather, the methods 1000 and 1100 are described in conjunction with one another for ease of explanation.

In method 1000, at Block 1002, a configuration can be transmitted for communicating in multiple virtual mini-slots of a slot. In an aspect, mini-slot defining component 352, e.g., in conjunction with processor(s) 312, memory 316, transceiver 302, feedback configuring component 146, etc., can transmit the configuration for communicating in multiple virtual mini-slots of the slot. In method 1100, at Block 1102, a configuration can be received for communicating in multiple virtual mini-slots of a slot. In an aspect, mini-slot determining component 252, e.g., in conjunction with processor(s) 212, memory 216, transceiver 202, feedback component 142, etc., can receive the configuration for communicating in the multiple virtual mini-slots of the slot. For example, the configuration may specify a partitioning of the slot into the virtual mini-slots. One specific non-limiting example of a virtual mini-slot partitioning is depicted by the collection of symbols 600 in FIG. 6A, as described above.

In method 1000, at Block 1004, an indication of a number of the multiple virtual mini-slots to occur between receiving a resource grant and communicating over resources corresponding to the resource grant can be transmitted. In an aspect, mini-slot defining component 352, e.g., in conjunction with processor(s) 312, memory 316, transceiver 302, etc., can transmit the indication of the number of the multiple virtual mini-slots to occur between receiving the resource grant and communicating over resources corresponding to the resource grant. In method 1100, optionally at Block 1104, an indication of a number of the multiple virtual mini-slots to occur between receiving a resource grant and communicating over resources corresponding to the resource grant can be received. In an aspect, mini-slot determining component 252, e.g., in conjunction with processor(s) 212, memory 216, transceiver 202, feedback component 142, etc., can receive the indication of the number of the multiple virtual mini-slots to occur between receiving the resource grant and communicating over resources corresponding to the resource grant. For example, for downlink communications, the number can be K0, as described above, and for uplink communications, the number can be K2, as described above. K0 and K2 can be virtual mini-slot based, such that mini-slot determining component 252 can determine when to receive shared data channel communications as a virtual mini-slot occurring K0 mini-slots after a downlink resource grant or K2 mini-slots after an uplink resource grant.

Thus, in method 1000 at Block 1006, and in method 1100 at Block 1106, resources corresponding to the resource grant can be communicated over based on the indication. In an aspect, mini-slot defining component 352, e.g., in conjunction with processor(s) 312, memory 316, transceiver 302, etc., and/or mini-slot determining component 252, e.g., in conjunction with processor(s) 212, memory 216, transceiver 202, feedback component 142, etc., can each communicate, based on the indication, over the resources corresponding to the resource grant. For uplink communications, for example, communicating at Block 1006 can optionally include, at Block 1008, receiving communications over uplink resources corresponding to an uplink resource grant (e.g., based on K2), and at Block 1106 can optionally include, at Block 1108, transmitting communications over uplink resources corresponding to an uplink resource grant (e.g., based on K2). For downlink communications, for example, communicating at Block 1006 can optionally include, at Block 1010, transmitting communications over downlink resources corresponding to a downlink resource grant (e.g., based on K0), and at Block 1106 can optionally include, at Block 1108, receiving communications over downlink resources corresponding to a downlink resource grant (e.g., based on K0).

Figure 12:
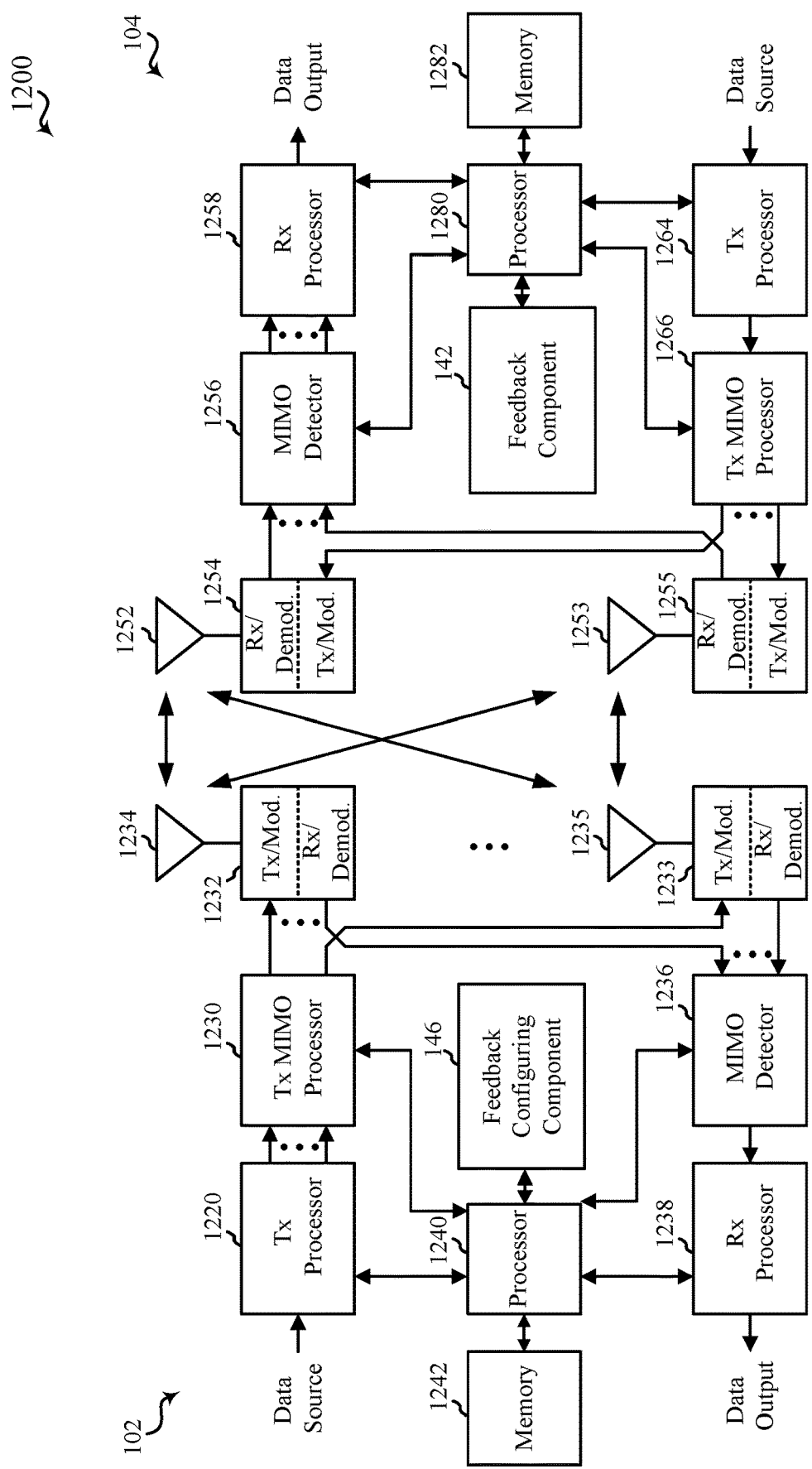
FIG. 12 is a block diagram illustrating an example of a MIMO communication system including a base station and a UE, in accordance with various aspects of the present disclosure.

FIG. 12 is a block diagram of a MIMO communication system 1200 including a base station 102 and a UE 104. The MIMO communication system 1200 may illustrate aspects of the wireless communication access network 100 described with reference to FIG. 1. The base station 102 may be an example of aspects of the base station 102 described with reference to FIG. 1. The base station 102 may be equipped with antennas 1234 and 1235, and the UE 104 may be equipped with antennas 1252 and 1253. In the MIMO communication system 1200, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulator/demodulators 1232 and 1233. Each modulator/demodulator 1232 through 1233 may process a respective output symbol stream (e.g., for OFDM, etc.) to obtain an output sample stream. Each modulator/demodulator 1232 through 1233 may further process (e.g., convert to analog, amplify, filter, and upconvert) the output sample stream to obtain a DL signal. In one example, DL signals from modulator/demodulators 1232 and 1233 may be transmitted via the antennas 1234 and 1235, respectively.

The UE 104 may be an example of aspects of the UEs 104 described with reference to FIGS. 1-2. At the UE 104, the UE antennas 1252 and 1253 may receive the DL signals from the base station 102 and may provide the received signals to the modulator/demodulators 1254 and 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from the modulator/demodulators 1254 and 1255, perform MIMO detection on the received symbols, if applicable, and provide detected symbols. A receive (Rx) processor 1258 may process (e.g., demodulate, deinterleave, and decode) the detected symbols, providing decoded data for the UE 104 to a data output, and provide decoded control information to a processor 1280, or memory 1282.

The processor 1280 may in some cases execute stored instructions to instantiate a feedback component 142 (see e.g., FIGS. 1 and 2).

On the uplink (UL), at the UE 104, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 and 1255 (e.g., for SC-FDMA, etc.), and be transmitted to the base station 102 in accordance with the communication parameters received from the base station 102. At the base station 102, the UL signals from the UE 104 may be received by the antennas 1234 and 1235, processed by the modulator/demodulators 1232 and 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a feedback configuring component 146 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1200. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1200.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication performed by a user equipment, comprising:
  receiving a configuration for transmitting feedback for communications received in multiple virtual mini-slots of a slot, wherein the configuration is based on a partitioning of the slot into the multiple virtual mini-slots;
  generating feedback for a communication received in one or more of the multiple virtual mini-slots;
  determining a virtual mini-slot over which to transmit the feedback based at least in part on determining a last symbol of the communication with respect to the one or more of the multiple virtual mini-slots; and transmitting, during the virtual mini-slot, the feedback for the communication.

2. The method of example 1, further comprising:
generating second feedback for a second communication received in a second one or more of the multiple virtual mini-slots;
determining a second virtual mini-slot of the slot over which to transmit the second feedback based at least in part on determining a second last symbol of the second communication with respect to the second one or more of the multiple virtual mini-slots; and
transmitting, during the second virtual mini-slot, the second feedback for the second communication,
wherein the second virtual mini-slot is different from the virtual mini-slot, and the second virtual mini-slot and the virtual mini-slot are within the same slot.

3. The method of any of examples 1 or 3, further comprising receiving a codebook configuration indicating, for each of multiple communications received in the multiple virtual mini-slots, a number of virtual mini-slots between a communication virtual mini-slot during which the last symbol of each of multiple communications is received and a feedback virtual mini-slot during which the feedback for the each of multiple communications is to be transmitted, wherein generating the feedback comprises generating the feedback for each of the multiple communications based on the codebook configuration.

4. The method of example 3, wherein generating the feedback comprises multiplexing the feedback for two or more communications based at least in part on determining that the codebook configuration indicates, for the two or more of the multiple communications, a same feedback virtual mini-slot.

5. The method of any of examples 3 or 4, wherein the codebook configuration further indicates a number of the communications for which to multiplex the feedback in the feedback virtual mini-slot, wherein generating the feedback comprises generating the feedback based on the number of the communications for which to multiplex the feedback.

6. The method of any of examples 3 to 5, wherein the codebook configuration indicates an index of a feedback starting symbol within the feedback virtual mini-slot of the slot.

7. The method of any of examples 1 to 6, wherein generating the feedback comprises grouping semi-persistent scheduling (SPS) communications into multiple groups within the slot, and generating combined feedback for each of the multiple groups, and wherein transmitting the feedback comprises transmitting the combined feedback for a given one of the multiple groups in the determined virtual mini-slot of the group.

8. The method of example 7, wherein determining the virtual mini-slot for transmitting the feedback is based at least in part on determining a number of virtual mini-slots between the given one of the multiple groups and a value indicated in an activation downlink control information received for the SPS communications.

9. The method of any of examples 7 or 8, wherein generating the feedback further comprises grouping dynamically scheduled communications into different multiple groups within the slot, and generating dynamic combined feedback for each of the different multiple groups, and wherein transmitting the feedback comprises multiplexing the combined feedback and the dynamic combined feedback for a given one of the multiple groups in at least one of the one or more of the multiple virtual mini-slots.

10. The method of example 9, wherein multiplexing the combined feedback and the dynamic combined feedback comprises determining one group of the multiple groups and one dynamic group of the different multiple groups having the same virtual mini-slot to transmit the corresponding combined feedback and dynamic combined feedback, and multiplexing the combined feedback from the one group with the dynamic combined feedback from the one dynamic group.

11. The method of example 10, wherein multiplexing the combined feedback and the dynamic combined feedback comprises appending bits of the combined feedback to bits of the dynamic combined feedback.

12. The method of any of examples 10 or 11, wherein multiplexing the combined feedback and the dynamic combined feedback comprises bundling the combined feedback into a lesser number of bits and append the bundled feedback to bits of the dynamic combined feedback.

13. The method of any of examples 1 to 12, wherein generating the feedback comprises determining, for each of the multiple virtual mini-slots, one or more possible resource allocations, and generating feedback as a number of configured bits for at least a portion of the one or more possible resource allocations.

14. The method of example 13, wherein determining, for one of the virtual mini-slots, a corresponding one of the one or more possible resource allocations is based on determining that a last symbol of the corresponding one of the one or more possible resource allocations is within the one of the virtual mini-slots.

15. The method of any of examples 13 or 14, wherein generating the feedback further comprises generating feedback as the number of configured bits for at least the portion of the one or more possible resource allocations and a number of transport blocks.

16. The method of any of examples 1 to 15, wherein receiving the configuration comprises receiving the configuration from a base station in a radio resource control (RRC) message or a downlink control information (DCI) message.

17. The method of any of examples 1 to 16, further comprising receiving, in a radio resource control (RRC) message, information indicating the partitioning of the slot.

18. The method of example 17, wherein the information includes a bitmap of length 14 indicating the partitioning for each of multiple symbols in the slot.

19. The method of any of examples 1 to 18, further comprising receiving, in downlink control information (DCI), information indicating the partitioning of the slot.

20. An apparatus for wireless communication, comprising:
a transceiver;
a memory configured to store instructions; and
one or more processors communicatively coupled with the transceiver and the memory, wherein the one or more processors are configured to:
receive a configuration for transmitting feedback for communications received in multiple virtual mini-slots of a slot, wherein the configuration is based on a partitioning of the slot into the multiple virtual mini-slots;
generate feedback for a communication received in one or more of the multiple virtual mini-slots;
determine a virtual mini-slot over which to transmit the feedback based at least in part on determining a last symbol of the communication with respect to the one or more of the multiple virtual mini-slots; and transmit, during the virtual mini-slot, the feedback for the communication.

21. The apparatus of example 20, wherein the one or more processors are further configured to:
generate second feedback for a second communication received in a second one or more of the multiple virtual mini-slots;
determine a second virtual mini-slot of the slot over which to transmit the second feedback based at least in part on determining a second last symbol of the second communication with respect to the second one or more of the multiple virtual mini-slots; and
transmit, during the second virtual mini-slot, the second feedback for the second communication,
wherein the second virtual mini-slot is different from the virtual mini-slot, and the second virtual mini-slot and the virtual mini-slot are within the same slot.

22. The apparatus of any of examples 20 or 21, wherein the one or more processors are further configured to receive a codebook configuration indicating, for each of multiple communications received in the multiple virtual mini-slots, a number of virtual mini-slots between a communication virtual mini-slot during which the last symbol of each of multiple communications is received and a feedback virtual mini-slot during which the feedback for the each of multiple communications is to be transmitted, wherein the one or more processors are configured to generate the feedback for each of the multiple communications based on the codebook configuration.

23. The apparatus of example 22, wherein the one or more processors are configured to generate the feedback at least in part by multiplexing the feedback for two or more communications based at least in part on determining that the codebook configuration indicates, for the two or more of the multiple communications, a same feedback virtual mini-slot.

24. The apparatus of any of examples 22 or 23, wherein the codebook configuration further indicates a number of the communications for which to multiplex the feedback in the feedback virtual mini-slot, wherein the one or more processors are configured to generate the feedback based on the number of the communications for which to multiplex the feedback.

25. The apparatus of any of examples 22 to 24, wherein the codebook configuration indicates an index of a feedback starting symbol within the feedback virtual mini-slot of the slot.

26. The apparatus of any of examples 20 to 25, wherein the one or more processors are configured to generate the feedback at least in part by grouping semi-persistent scheduling (SPS) communications into multiple groups within the slot, and generating combined feedback for each of the multiple groups, and wherein the one or more processors are configured to transmit the combined feedback for a given one of the multiple groups in the determined virtual mini-slot of the group.

27. The apparatus of example 26, wherein the one or more processors are configured to determine the virtual mini-slot for transmitting the feedback based at least in part on determining a number of virtual mini-slots between the given one of the multiple groups and a value indicated in an activation downlink control information received for the SPS communications.

28. The apparatus of any of examples 26 or 27, wherein the one or more processors are configured to generate the feedback at least in part by grouping dynamically scheduled communications into different multiple groups within the slot, and generating dynamic combined feedback for each of the different multiple groups, and wherein the one or more processors are configured to transmit the feedback at least in part by multiplexing the combined feedback and the dynamic combined feedback for a given one of the multiple groups in at least one of the one or more of the multiple virtual mini-slots.

29. The apparatus of example 28, wherein multiplexing the combined feedback and the dynamic combined feedback comprises determining one group of the multiple groups and one dynamic group of the different multiple groups having the same virtual mini-slot to transmit the corresponding combined feedback and dynamic combined feedback, and multiplexing the combined feedback from the one group with the dynamic combined feedback from the one dynamic group.

30. The apparatus of example 29, wherein multiplexing the combined feedback and the dynamic combined feedback comprises appending bits of the combined feedback to bits of the dynamic combined feedback.

31. The apparatus of any of examples 29 or 30, wherein multiplexing the combined feedback and the dynamic combined feedback comprises bundling the combined feedback into a lesser number of bits and append the bundled feedback to bits of the dynamic combined feedback.

32. The apparatus of any of examples 20 or 31, wherein the one or more processors are configured to generate the feedback at least in part by determining, for each of the multiple virtual mini-slots, one or more possible resource allocations, and generating feedback as a number of configured bits for at least a portion of the one or more possible resource allocations.

33. The apparatus of example 32, wherein the one or more processors are configured to determine, for one of the virtual mini-slots, a corresponding one of the one or more possible resource allocations based on determining that a last symbol of the corresponding one of the one or more possible resource allocations is within the one of the virtual mini-slots.

34. The apparatus of any of examples 32 or 33, wherein the one or more processors are configured to generate the feedback as the number of configured bits for at least the portion of the one or more possible resource allocations and a number of transport blocks.

35. The apparatus of any of examples 20 to 34, wherein the one or more processors are configured to receive the configuration from a base station in a radio resource control (RRC) message or a downlink control information (DCI) message.

36. The apparatus of any of examples 20 to 35, wherein the one or more processors are further configured to receive, in a radio resource control (RRC) message, information indicating the partitioning of the slot.

37. The apparatus of example 36, wherein the information includes a bitmap of length 14 indicating the partitioning for each of multiple symbols in the slot.

38. The apparatus of any of examples 20 to 37, wherein the one or more processors are further configured to receive, in downlink control information (DCI), information indicating the partitioning of the slot.

39. An apparatus for wireless communication, comprising:
means for receiving a configuration for transmitting feedback for communications received in multiple virtual mini-slots of a slot, wherein the configuration is based on a partitioning of the slot into the multiple virtual mini-slots;

means for generating feedback for a communication received in one or more of the multiple virtual mini-slots;

means for determining a virtual mini-slot over which to transmit the feedback based at least in part on determining a last symbol of the communication with respect to the one or more of the multiple virtual mini-slots; and means for transmitting, during the virtual mini-slot, the feedback for the communication.

40. The apparatus of example 39, further comprising:

means for generating second feedback for a second communication received in a second one or more of the multiple virtual mini-slots;

means for determining a second virtual mini-slot of the slot over which to transmit the second feedback based at least in part on determining a second last symbol of the second communication with respect to the second one or more of the multiple virtual mini-slots; and means for transmitting, during the second virtual mini-slot, the second feedback for the second communication, wherein the second virtual mini-slot is different from the virtual mini-slot, and the second virtual mini-slot and the virtual mini-slot are within the same slot.

41. The apparatus of any of examples 39 or 40, further comprising means for receiving a codebook configuration indicating, for each of multiple communications received in the multiple virtual mini-slots, a number of virtual mini-slots between a communication virtual mini-slot during which the last symbol of each of multiple communications is received and a feedback virtual mini-slot during which the feedback for the each of multiple communications is to be transmitted, wherein the means for generating generates the feedback for each of the multiple communications based on the codebook configuration.

42. The apparatus of example 41, wherein the means for generating the feedback multiplexes the feedback for two or more communications based at least in part on determining that the codebook configuration indicates, for the two or more of the multiple communications, a same feedback virtual mini-slot.

43. The apparatus of any of examples 41 or 42, wherein the codebook configuration further indicates a number of the communications for which to multiplex the feedback in the feedback virtual mini-slot, wherein the means for generating generates the feedback based on the number of the communications for which to multiplex the feedback.

44. The apparatus of any of examples 41 to 43, wherein the codebook configuration indicates an index of a feedback starting symbol within the feedback virtual mini-slot of the slot.

45. The apparatus of any of examples 39 to 44, wherein the means for generating groups semi-persistent scheduling (SPS) communications into multiple groups within the slot, and generates combined feedback for each of the multiple groups, and wherein the means for transmitting transmits the combined feedback for a given one of the multiple groups in the determined virtual mini-slot of the group.

46. The apparatus of example 45, wherein the means for determining the virtual mini-slot for transmitting the feedback is based at least in part on determining a number of virtual mini-slots between the given one of the multiple groups and a value indicated in an activation downlink control information received for the SPS communications.

47. The apparatus of any of examples 45 or 46, wherein the means for generating groups dynamically scheduled communications into different multiple groups within the slot, and generates dynamic combined feedback for each of the different multiple groups, and wherein the means for transmitting multiplexes the combined feedback and the dynamic combined feedback for a given one of the multiple groups in at least one of the one or more of the multiple virtual mini-slots.

48. The apparatus of example 47, wherein the means for transmitting multiplexes the combined feedback and the dynamic combined feedback at least in part by determining one group of the multiple groups and one dynamic group of the different multiple groups having the same virtual mini-slot to transmit the corresponding combined feedback and dynamic combined feedback, and multiplexes the combined feedback from the one group with the dynamic combined feedback from the one dynamic group.

49. The apparatus of example 48, wherein the means for transmitting multiplexes the combined feedback and the dynamic combined feedback at least in part by appending bits of the combined feedback to bits of the dynamic combined feedback.

50. The apparatus of any of examples 48 or 49, wherein the means for transmitting multiplexes the combined feedback and the dynamic combined feedback at least in part by bundling the combined feedback into a lesser number of bits and append the bundled feedback to bits of the dynamic combined feedback.

51. The apparatus of any of examples 39 to 50, wherein the means for generating determines, for each of the multiple virtual mini-slots, one or more possible resource allocations, and generates feedback as a number of configured bits for at least a portion of the one or more possible resource allocations.

52. The apparatus of example 51, wherein the means for determining determines, for one of the virtual mini-slots, a corresponding one of the one or more possible resource allocations based on determining that a last symbol of the corresponding one of the one or more possible resource allocations is within the one of the virtual mini-slots.

53. The apparatus of any of examples 51 or 53, wherein the means for generating generates feedback as a number of configured bits for at least the portion of the one or more possible resource allocations and a number of transport blocks.

54. The apparatus of any of examples 39 to 53, wherein the means for receiving receives the configuration from a base station in a radio resource control (RRC) message or a downlink control information (DCI) message.

55. The apparatus of any of examples 39 to 54, further comprising means for receiving, in a radio resource control (RRC) message, information indicating the partitioning of the slot.

56. The apparatus of example 55, wherein the information includes a bitmap of length 14 indicating the partitioning for each of multiple symbols in the slot.

57. The apparatus of any of examples 39 to 56, further comprising means for receiving, in downlink control information (DCI), information indicating the partitioning of the slot.

58. A computer-readable medium, comprising code executable by one or more processors for wireless communication, the code comprising code for:

receiving a configuration for transmitting feedback for communications received in multiple virtual mini-slots of a slot, wherein the configuration is based on a partitioning of the slot into the multiple virtual mini-slots;

generating feedback for a communication received in one or more of the multiple virtual mini-slots;

determining a virtual mini-slot over which to transmit the feedback based at least in part on determining a last symbol of the communication with respect to the one or more of the multiple virtual mini-slots; and transmitting, during the virtual mini-slot, the feedback for the communication.

59. The computer-readable medium of example 58, further comprising:

code for generating second feedback for a second communication received in a second one or more of the multiple virtual mini-slots;

code for determining a second virtual mini-slot of the slot over which to transmit the second feedback based at least in part on determining a second last symbol of the second communication with respect to the second one or more of the multiple virtual mini-slots; and code for transmitting, during the second virtual mini-slot, the second feedback for the second communication, wherein the second virtual mini-slot is different from the virtual mini-slot, and the second virtual mini-slot and the virtual mini-slot are within the same slot.

60. The computer-readable medium of any of examples 58 or 59, further comprising code for receiving a codebook configuration indicating, for each of multiple communications received in the multiple virtual mini-slots, a number of virtual mini-slots between a communication virtual mini-slot during which the last symbol of each of multiple communications is received and a feedback virtual mini-slot during which the feedback for the each of multiple communications is to be transmitted, wherein the code for generating generates the feedback for each of the multiple communications based on the codebook configuration.

61. The computer-readable medium of example 60, wherein the code for generating the feedback multiplexes the feedback for two or more communications based at least in part on determining that the codebook configuration indicates, for the two or more of the multiple communications, a same feedback virtual mini-slot.

62. The computer-readable medium of any of examples 60 or 61, wherein the codebook configuration further indicates a number of the communications for which to multiplex the feedback in the feedback virtual mini-slot, wherein the code for generating generates the feedback based on the number of the communications for which to multiplex the feedback.

63. The computer-readable medium of any of examples 60 to 62, wherein the codebook configuration indicates an index of a feedback starting symbol within the feedback virtual mini-slot of the slot.

64. The computer-readable medium of any of examples 58 to 63, wherein the code for generating groups semi-persistent scheduling (SPS) communications into multiple groups within the slot, and generates combined feedback for each of the multiple groups, and wherein the code for transmitting transmits the combined feedback for a given one of the multiple groups in the determined virtual mini-slot of the group.

65. The computer-readable medium of example 64, wherein the code for determining the virtual mini-slot for transmitting the feedback is based at least in part on determining a number of virtual mini-slots between the given one of the multiple groups and a value indicated in an activation downlink control information received for the SPS communications.

66. The computer-readable medium of any of examples 64 or 65, wherein the code for generating groups dynamically scheduled communications into different multiple groups within the slot, and generates dynamic combined feedback for each of the different multiple groups, and wherein the code for transmitting multiplexes the combined feedback and the dynamic combined feedback for a given one of the multiple groups in at least one of the one or more of the multiple virtual mini-slots.

67. The computer-readable medium of example 66, wherein the code for transmitting multiplexes the combined feedback and the dynamic combined feedback at least in part by determining one group of the multiple groups and one dynamic group of the different multiple groups having the same virtual mini-slot to transmit the corresponding combined feedback and dynamic combined feedback, and multiplexes the combined feedback from the one group with the dynamic combined feedback from the one dynamic group.

68. The computer-readable medium of example 67, wherein the code for transmitting multiplexes the combined feedback and the dynamic combined feedback at least in part by appending bits of the combined feedback to bits of the dynamic combined feedback.

69. The computer-readable medium of any of examples 67 or 68, wherein the code for transmitting multiplexes the combined feedback and the dynamic combined feedback at least in part by bundling the combined feedback into a lesser number of bits and append the bundled feedback to bits of the dynamic combined feedback.

70. The computer-readable medium of any of examples 58 to 69, wherein the code for generating determines, for each of the multiple virtual mini-slots, one or more possible resource allocations, and generates feedback as a number of configured bits for at least a portion of the one or more possible resource allocations.

71. The computer-readable medium of example 70, wherein the code for determining determines, for one of the virtual mini-slots, a corresponding one of the one or more possible resource allocations based on determining that a last symbol of the corresponding one of the one or more possible resource allocations is within the one of the virtual mini-slots.

72. The computer-readable medium of any of examples 70 or 71, wherein the code for generating generates feedback as a number of configured bits for at least the portion of the one or more possible resource allocations and a number of transport blocks.

73. The computer-readable medium of any of examples 58 to 72, wherein the code for receiving receives the configuration from a base station in a radio resource control (RRC) message or a downlink control information (DCI) message.

74. The computer-readable medium of any of examples 58 to 73, further comprising code for receiving, in a radio resource control (RRC) message, information indicating the partitioning of the slot.

75. The computer-readable medium of example 74, wherein the information includes a bitmap of length 14 indicating the partitioning for each of multiple symbols in the slot.

76. The computer-readable medium of any of examples 58 to 75, further comprising code for receiving, in downlink control information (DCI), information indicating the partitioning of the slot.

What is claimed is:

1. A method for wireless communication, comprising:
transmitting, to a user equipment (UE), a configuration for transmitting feedback for communications received in multiple virtual mini-slots of a slot, wherein the configuration is based on a partitioning of the slot into the multiple virtual mini-slots;
transmitting, to the UE, a communication in one or more of the multiple virtual mini-slots;
receiving, from the UE, based on the configuration, and in a virtual mini-slot that is based on a last symbol of the communication with respect to the one or more of the multiple virtual mini-slots over which feedback can be transmitted, feedback for the communication;
transmitting, to the UE, a second communication in a second one or more of the multiple virtual mini-slots; and
receiving, from the UE, based on the configuration, and in a second virtual mini-slot that is based on a second last symbol of the second communication with respect to the second one or more of the multiple virtual mini-slots over which feedback can be transmitted, second feedback for the second communication,
wherein the second virtual mini-slot is different from the virtual mini-slot, and the second virtual mini-slot and the virtual mini-slot are within the same slot.

2. The method of claim 1, further comprising transmitting a codebook configuration indicating, for each of multiple communications transmitted in the multiple virtual mini-slots, a number of virtual mini-slots between a communication virtual mini-slot during which the last symbol of each of multiple communications is transmitted and a feedback virtual mini-slot during which the feedback for the each of multiple communications is to be transmitted.

3. The method of claim 2, wherein the feedback is part of multiplexed feedback for two or more communications based on the codebook configuration, and further comprising processing the multiplexed feedback to obtain the feedback for the communication.

4. The method of claim 2, wherein the codebook configuration further indicates a number of the communications for which to multiplex the feedback in the feedback virtual mini-slot.

5. The method of claim 2, wherein the codebook configuration indicates an index of a feedback symbol within the one or more of the multiple virtual mini-slots of the slot.

6. The method of claim 1, further comprising indicating a grouping of semi-persistent scheduling (SPS) communications into multiple groups within the slot for transmitting feedback for each of the multiple groups, wherein the feedback includes combined feedback for one group of the multiple groups in the one or more of the multiple virtual mini-slots of the one group.

7. The method of claim 6, wherein the virtual mini-slot for transmitting the feedback is based at least in part on a number of virtual mini-slots between the one group and a value indicated in an activation downlink control information transmitted for the SPS communications.

8. The method of claim 6, wherein the combined feedback is part of multiplexed feedback including the combined feedback and dynamic combined feedback, wherein the dynamic combined feedback corresponds to multiple groups of dynamically scheduled communications within the one or more of the multiple virtual mini-slots of the one group.

9. The method of claim 8, further comprising processing the multiplexed feedback to determine the combined feedback as appended bits that are appended to the bits of the dynamic combined feedback.

10. The method of claim 9, wherein the combined feedback is bundled into a lesser number of bits than feedback for each of the SPS communications in the one group.

11. The method of claim 1, further comprising processing the feedback based on a number of configured bits for at least a portion of one or more possible resource allocations for each of the multiple virtual mini-slots.

12. The method of claim 11, wherein processing the feedback is further based on a number of transport blocks.

13. The method of claim 1, wherein transmitting the configuration includes transmitting the configuration to the UE in radio resource control (RRC) signaling or downlink control information (DCI).

14. The method of claim 1, further comprising transmitting, in radio resource control (RRC) signaling, information indicating the partitioning of the slot.

15. The method of claim 14, wherein the information includes a bitmap of length 14 indicating the partitioning for each of multiple symbols in the slot.

16. The method of claim 1, further comprising transmitting, in downlink control information (DCI), information indicating the partitioning of the slot.

17. An apparatus for wireless communication, comprising:
a transceiver;
a memory configured to store instructions; and
one or more processors communicatively coupled with the transceiver and the memory, wherein the one or more processors are configured to:
transmit, to a user equipment (UE), a configuration for transmitting feedback for communications received in multiple virtual mini-slots of a slot, wherein the configuration is based on a partitioning of the slot into the multiple virtual mini-slots;
transmit, to the UE, a communication in one or more of the multiple virtual mini-slots;
receive, from the UE, based on the configuration, and in a virtual mini-slot that is based on a last symbol of the communication with respect to the one or more of the multiple virtual mini-slots over which feedback can be transmitted, feedback for the communication;
transmit, to the UE, a second communication in a second one or more of the multiple virtual mini-slots; and
receive, from the UE, based on the configuration, and in a second virtual mini-slot that is based on a second last symbol of the second communication with respect to the second one or more of the multiple virtual mini-slots over which feedback can be transmitted, second feedback for the second communication,
wherein the second virtual mini-slot is different from the virtual mini-slot, and the second virtual mini-slot and the virtual mini-slot are within the same slot.

18. The apparatus of claim 17, wherein the one or more processors are further configured to transmit a codebook configuration indicating, for each of multiple communications transmitted in the multiple virtual mini-slots, a number of virtual mini-slots between a communication virtual mini-slot during which the last symbol of each of multiple communications is transmitted and a feedback virtual mini-slot during which the feedback for the each of multiple communications is to be transmitted.

19. The apparatus of claim 18, wherein the feedback is part of multiplexed feedback for two or more communications based on the codebook configuration, and wherein the one or more processors are further configured to process the multiplexed feedback to obtain the feedback for the communication.

20. The apparatus of claim 18, wherein the codebook configuration further indicates a number of the communications for which to multiplex the feedback in the feedback virtual mini-slot.

21. The apparatus of claim 18, wherein the codebook configuration indicates an index of a feedback symbol within the one or more of the multiple virtual mini-slots of the slot.

22. The apparatus of claim 17, wherein the one or more processors are further configured to indicate a grouping of semi-persistent scheduling (SPS) communications into multiple groups within the slot for transmitting feedback for each of the multiple groups, wherein the feedback includes combined feedback for one group of the multiple groups in the one or more of the multiple virtual mini-slots of the one group.

23. The apparatus of claim 22, wherein the virtual mini-slot for transmitting the feedback is based at least in part on a number of virtual mini-slots between the one group and a value indicated in an activation downlink control information transmitted for the SPS communications.

24. The apparatus of claim 22, wherein the combined feedback is part of multiplexed feedback including the combined feedback and dynamic combined feedback, wherein the dynamic combined feedback corresponds to multiple groups of dynamically scheduled communications within the one or more of the multiple virtual mini-slots of the one group.

25. The apparatus of claim 24, wherein the one or more processors are further configured to process the multiplexed feedback to determine the combined feedback as appended bits that are appended to the bits of the dynamic combined feedback.

26. The apparatus of claim 25, wherein the combined feedback is bundled into a lesser number of bits than feedback for each of the SPS communications in the one group.

27. The apparatus of claim 17, wherein the one or more processors are further configured to process the feedback based on a number of configured bits for at least a portion of one or more possible resource allocations for each of the multiple virtual mini-slots.

28. The apparatus of claim 27, wherein the one or more processors are configured to process the feedback further based on a number of transport blocks.

29. The apparatus of claim 17, wherein the one or more processors are configured to transmit the configuration to the UE in radio resource control (RRC) signaling or downlink control information (DCI).

30. The apparatus of claim 17, wherein the one or more processors are further configured to transmit, in radio resource control (RRC) signaling, information indicating the partitioning of the slot.

31. The apparatus of claim 30, wherein the information includes a bitmap of length 14 indicating the partitioning for each of multiple symbols in the slot.

32. The apparatus of claim 17, wherein the one or more processors are further configured to transmit, in downlink control information (DCI), information indicating the partitioning of the slot.

33. An apparatus for wireless communication, comprising:
- means for transmitting, to a user equipment (UE), a configuration for transmitting feedback for communications received in multiple virtual mini-slots of a slot, wherein the configuration is based on a partitioning of the slot into the multiple virtual mini-slots;
- means for transmitting, to the UE, a communication in one or more of the multiple virtual mini-slots;
- means for receiving, from the UE, based on the configuration, and in a virtual mini-slot that is based on a last symbol of the communication with respect to the one or more of the multiple virtual mini-slots over which feedback can be transmitted, feedback for the communication;
- means for transmitting, to the UE, a second communication in a second one or more of the multiple virtual mini-slots; and
- means for receiving, from the UE, based on the configuration, and in a second virtual mini-slot that is based on a second last symbol of the second communication with respect to the second one or more of the multiple virtual mini-slots over which feedback can be transmitted, second feedback for the second communication,
- wherein the second virtual mini-slot is different from the virtual mini-slot, and the second virtual mini-slot and the virtual mini-slot are within the same slot.

34. A non-transitory computer-readable medium, comprising code executable by one or more processors for wireless communication, the code comprising code for:
- transmitting, to a user equipment (UE), a configuration for transmitting feedback for communications received in multiple virtual mini-slots of a slot, wherein the configuration is based on a partitioning of the slot into the multiple virtual mini-slots;
- transmitting, to the UE, a communication in one or more of the multiple virtual mini-slots;
- receiving, from the UE, based on the configuration, and in a virtual mini-slot that is based on a last symbol of the communication with respect to the one or more of the multiple virtual mini-slots over which feedback can be transmitted, feedback for the communication;
- transmitting, to the UE, a second communication in a second one or more of the multiple virtual mini-slots; and
- receiving, from the UE, based on the configuration, and in a second virtual mini-slot that is based on a second last symbol of the second communication with respect to the second one or more of the multiple virtual mini-slots over which feedback can be transmitted, second feedback for the second communication,
- wherein the second virtual mini-slot is different from the virtual mini-slot, and the second virtual mini-slot and the virtual mini-slot are within the same slot.

* * * * *